(12) United States Patent
Birkestrand

(10) Patent No.: US 11,781,521 B2
(45) Date of Patent: Oct. 10, 2023

(54) TOROIDAL LIFT FORCE ENGINE

(71) Applicant: Orville J. Birkestrand, Davenport, IA (US)

(72) Inventor: Orville J. Birkestrand, Davenport, IA (US)

(*) Notice: Subject to any disclaimer, the term of this patent is extended or adjusted under 35 U.S.C. 154(b) by 385 days.

(21) Appl. No.: 17/186,739

(22) Filed: Feb. 26, 2021

(65) Prior Publication Data

US 2021/0270230 A1   Sep. 2, 2021

Related U.S. Application Data

(60) Provisional application No. 62/982,421, filed on Feb. 27, 2020.

(51) Int. Cl.
| | |
|---|---|
| *F03D 1/02* | (2006.01) |
| *F03B 3/04* | (2006.01) |
| *F01D 13/00* | (2006.01) |
| *F01D 5/02* | (2006.01) |
| *F01D 13/02* | (2006.01) |

(Continued)

(52) U.S. Cl.
CPC .............. *F03D 1/02* (2013.01); *F01D 5/021* (2013.01); *F01D 13/00* (2013.01); *F01D 13/003* (2013.01); *F01D 13/006* (2013.01); *F01D 13/02* (2013.01); *F03B 3/02* (2013.01); *F03B 3/04* (2013.01); *F03B 3/12* (2013.01); *F03B 3/18* (2013.01); *F03D 1/0633* (2013.01); *F03D 3/02* (2013.01); *F03D 7/0276* (2013.01); *F03D 13/10* (2016.05)

(58) Field of Classification Search
CPC ........ F01D 5/021; F01D 13/006; F01D 13/02; F03B 3/04; F03D 1/02
See application file for complete search history.

(56) References Cited

U.S. PATENT DOCUMENTS

| | | |
|---|---|---|
| 4,108,403 A | 8/1978 | Finch |
| 4,143,522 A | 3/1979 | Hamrick et al. |

(Continued)

FOREIGN PATENT DOCUMENTS

| | | |
|---|---|---|
| EP | 2 006 537 A2 | 12/2008 |
| RU | 2193090 C1 | 11/2002 |

(Continued)

OTHER PUBLICATIONS

"Notification of Transmittal of the International Search Report and the Written Opinion of the International Searching Authority, or the Declaration," International Filing Date: Feb. 26, 2021, International Application No. PCT/US2021/019925, Applicant: Birkestrand, Orville J., dated Jun. 9, 2021, pp. 1-15.

(Continued)

*Primary Examiner* — Brian O Peters
(74) *Attorney, Agent, or Firm* — Cesari and McKenna, LLP

(57) ABSTRACT

A toroidal lift force engine is provided. Illustratively, the toroidal lift force engine operates in an enclosed environment without heat and/or expelling particles of any kind, utilizing asymmetric pressure distribution on lift turbine blades solely to generate thrust with the normal component of this lift force, while using the tangential component of this lift force to drive accessories, provide control to the fluid velocity, and/or provide motivation of the fluid's flow. The toroidal lift force engine may be utilized to generate thrust, heat and/or electricity for powering vehicles, homes, etc.

23 Claims, 29 Drawing Sheets

(51) Int. Cl.
*F03D 13/10* (2016.01)
*F03D 1/06* (2006.01)
*F03D 7/02* (2006.01)
*F03B 3/18* (2006.01)
*F03B 3/12* (2006.01)
*F03D 3/02* (2006.01)
*F03B 3/02* (2006.01)

(56) References Cited

U.S. PATENT DOCUMENTS

| | | |
|---|---|---|
| 4,537,146 A | 8/1985 | Wainwright |
| 5,140,170 A | 8/1992 | Henderson |
| 5,570,859 A | 11/1996 | Quandt |
| 5,895,015 A | 4/1999 | Saiz |
| 6,216,454 B1 | 4/2001 | Tsuzuki |
| 6,247,670 B1 | 6/2001 | Eliahou-Niv et al. |
| 6,499,690 B1 | 12/2002 | Katayama et al. |
| 6,988,357 B2 | 1/2006 | Dev |
| 7,204,674 B2 | 4/2007 | Wobben |
| 7,293,959 B2 | 11/2007 | Pedersen et al. |
| 7,989,973 B2 | 8/2011 | Birkestrand |
| 8,651,813 B2 | 2/2014 | Long |
| 8,742,610 B2 | 6/2014 | Brown |
| 9,004,864 B2 | 4/2015 | Stimm |
| 9,187,987 B2 | 11/2015 | Greene et al. |
| 9,328,576 B2 | 5/2016 | Cramer et al. |
| 9,816,383 B2 | 11/2017 | Birkestrand |
| 9,816,384 B2 | 11/2017 | Birkestrand |
| 9,835,140 B2 | 12/2017 | Henderson et al. |
| 2011/0079010 A1 | 4/2011 | McBride et al. |
| 2011/0116923 A1 | 5/2011 | Larsen et al. |
| 2011/0142681 A1 | 6/2011 | Fisher et al. |
| 2012/0061972 A1 | 3/2012 | Young |
| 2012/0104752 A1 | 5/2012 | Tsutsumi et al. |
| 2012/0161442 A1 | 6/2012 | Chapple |
| 2017/0211829 A1 | 7/2017 | Slack et al. |
| 2018/0298881 A1 | 10/2018 | Mathers |

FOREIGN PATENT DOCUMENTS

| | | |
|---|---|---|
| RU | 2224077 C2 | 2/2004 |
| WO | WO-2008/111922 A2 | 9/2008 |
| WO | WO-2009/097850 | 8/2009 |
| WO | WO-2015/012677 A1 | 1/2015 |

OTHER PUBLICATIONS

PCT Notification of Transmittal of the International Search Report and the Written Opinion of the International Searching Authority, or the Declaration, International Searching Authority, International Application No. PCT/US2013/077987, dated Jun. 2, 2014, 9 pages.
U.S. Appl. No. 15/482,313, filed Apr. 7, 2017 by Orville J. Birkestrand for Wind Turbine, pp. 1-39.

$F_L/F_D \geq 30:1$

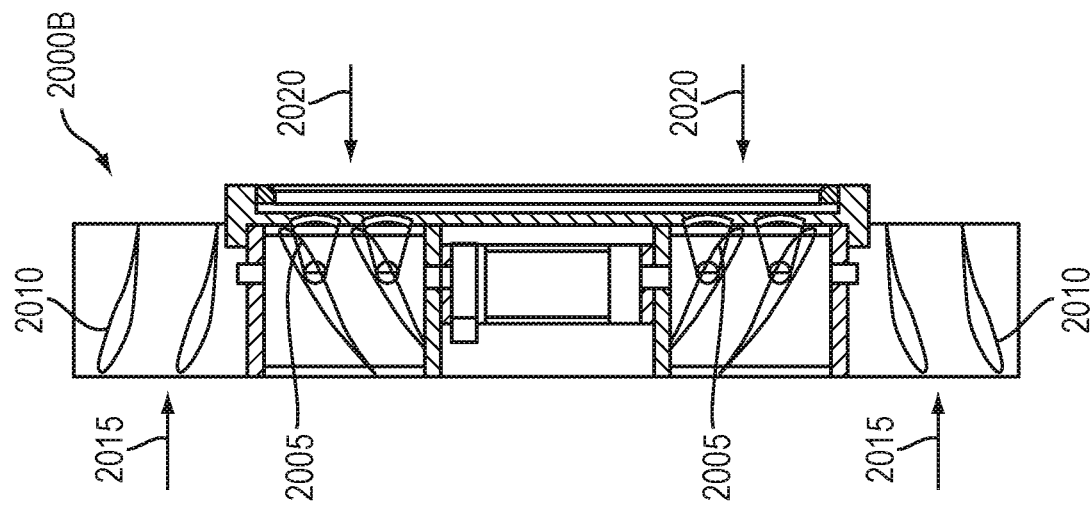
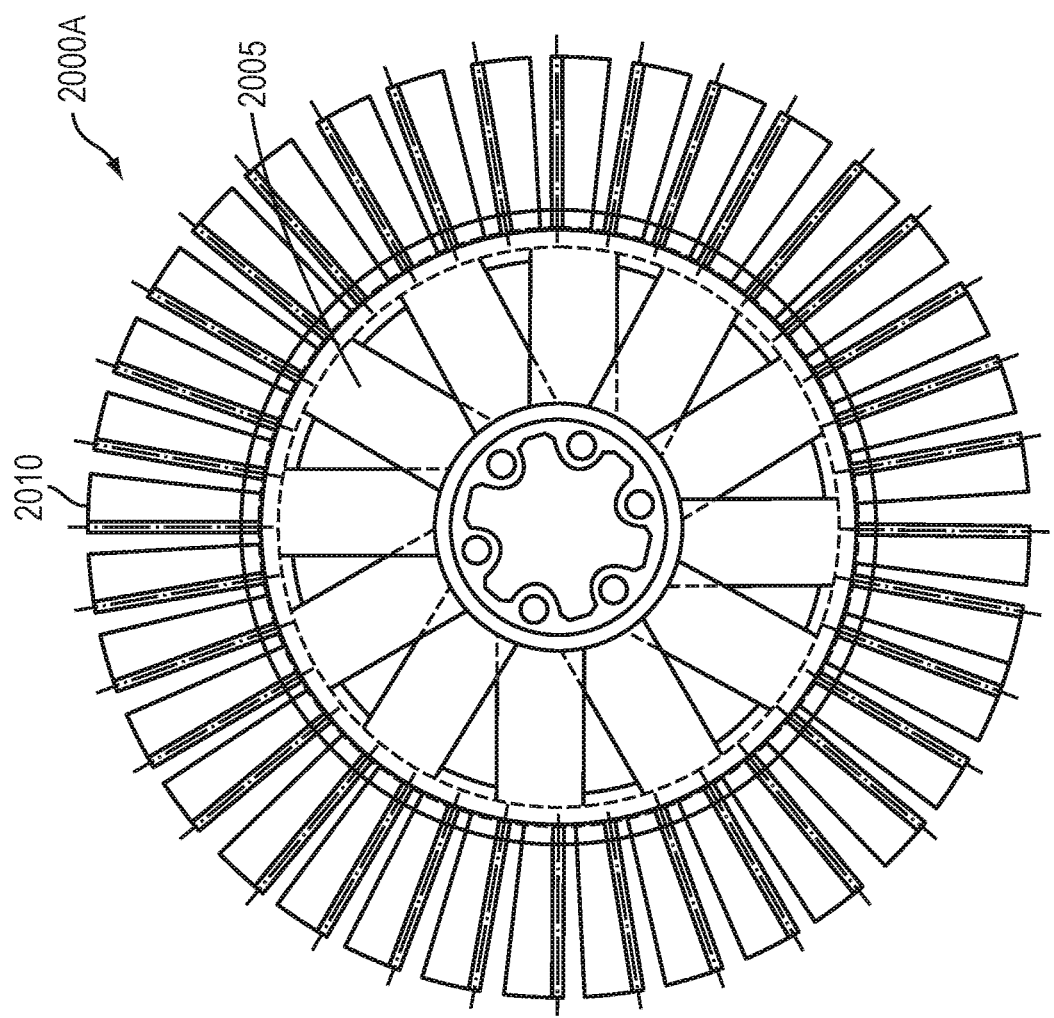

TOROIDAL LIFT FORCE ENGINE

CROSS-REFERENCE TO RELATED APPLICATIONS

The present application claims priority to U.S. Provisional Patent Application Ser. No. 62/982,421, filed on Feb. 27, 2020 entitled TOROIDAL LIFT FORCE ENGINE, by Orville J. Birkestrand, the contents of which are here incorporated by reference.

The present application is related to: U.S. patent application Ser. No. 13/729,205, filed on Dec. 28, 2012 entitled POWER GENERATION APPARATUS, issued on Nov. 14, 2017 as U.S. Pat. No. 9,816,383; U.S. patent application Ser. No. 14/141,986, filed on Dec. 27, 2013 entitled POWER GENERATION APPARATUS, issued on Nov. 14, 2017 as U.S. Pat. No. 9,816,384; and U.S. patent application Ser. No. 15/482,313, entitled WIND TURBINE filed on Apr. 7, 2017, all by Orville J. Birkestrand, the contents of each are hereby incorporated by reference.

BACKGROUND

FIG. 1 is a front view of an exemplary prior art farm windmill 100 that is well known to those skilled in the art. The windmill 100 includes a plurality (typically 18) of blades 105 that are configured in a substantially circular arrangement and operatively interconnected with a gearbox 110. A platform 115 is arranged slightly below the bottom level of the blades 105 to enable easy access to the blades 105 and/or the gearbox 110 for maintenance purposes, etc. The gearbox 110 is operatively interconnected with a pump pole 120 which terminates in a connector 125. The connector 125 is further interconnected with a pump rod 130 that is encased by a standpipe 135 that extends into a well 140. Typically, a well casing 145 surrounds the entry into the well 140 and provides support for a discharge point 150.

A windmill tower 160 provides structural support so that the blades 105 are located at a substantial height above the ground to enable wind to reach them without obstructions from buildings, terrain, etc. The tower 160 also provides support to counteract the forces caused by the blades 105 rotating in the wind, which may be a lateral force that could cause the windmill to tip over if the wind reaches a sufficient velocity. As such, windmills 100 typically are configured to rotate out of the wind in the event that the wind speed reaches a predetermined threshold. This protects the blades 105 and tower 160 from damage and/or destruction caused by the blades rotating at too high a speed and/or generating too much lateral force on the tower 160.

In operation, the wind causes the blades 105 to spin, thereby turning the gearbox 110, which activates the pump via the pump rod 130 to provide a conventional pumping mechanism to draw water from the well's reservoir to be discharged out the discharge point 150. As will be appreciated by those skilled in the art, the farm windmill 100 is typically limited to pumping water (or other fluid). A conventional farm windmill 100 is further limited to certain wind speeds and has an extremely low efficiency at higher wind speeds. This low efficiency results from their primary design to produce torque at low wind speeds to supply sole source water on even nearly windless days to distant and dependent animals.

FIG. 2 is an exemplary front perspective view of a modern prior art wind turbine 200 that may be utilized for power generation. The wind turbine 200 comprises a plurality (typically three) of blades 215 that are mounted on a hub that is supported by a tower 210. Typical modern wind turbines are mounted at heights on the order of tens of meters (e.g., 90 meters) with blades that are also on the order of tens of meters long. Modern wind turbines 200 often encase all operating components within the tower 210 or within the supporting base 205. As such, external views of the wind turbine do not display its operation as it does for a conventional farm windmill 100.

A noted disadvantage of modern wind turbines 200 is that they typically do not include a separate mechanism to prevent stalling of the wind turbine should the wind flow slow down or should a highspeed spike occur over the blades 215. Commonly, such micro stalls occur due to, e.g., momentary spikes and/or lulls in the wind flowing over the blades 205 of the turbine 200. Without a mechanism to combat such spikes or stalls, the overall efficiency of the wind turbine 200 is significantly further reduced. Modern wind turbines do not have a simple control system to actively automatically track the rotor's rotations per minute (RPM) in relation to the wind's instantaneous speed to maintain the desired wind attack angle at all times. Instead, they commonly mainly operate at approximately one speed (RPM) to generate a required grid frequency. More recent machines may be equipped with elaborate and expensive electronic control systems which permit modest speed variations on the order of ±20%. Such control limitations limit their possible maximum efficiencies. Additionally, they have to operate as tip speed rations (TSR's) of 6 or more with their blade chords at the rotor tip in the plane of the rotor, so that they are not back winded and stopped when the wind suddenly stalls, as they would with the ever present and unavoidable atmospheric turbulences.

Conventional three-bladed windmills/wind turbines capture only the tangential portion of the lift force, or about 6%, of the total lift forces generated because they normally operate at a TSR of 6 or more. The remainder or normal component of the lift forces is counteracted by trying to overturn the tower and is consequently totally unutilized. This causes exemplary towers 160, 210 and/or foundations 205 to be overbuilt in order to prevent the tower from being tipped over. Further, conventional windmills illustratively capture none of the possible productive forces to produce useful power from the flow from one blade enhancing the flow over other neighboring blades.

Under conventional thinking, all wind machines are limited by the Betz law that states that no turbine can capture more than 16/27 (59.3%) percent of the kinetic energy in the wind. This factor 16/27 (or 0.593) is known as the Betz limit. Conventional state of art three bladed windmills currently peak at approximately 75 to 80% of the Betz limit. The Betz limit claims to produce a theoretical upper bound amount of energy that may be extracted at any particular windmill site and is reasonable for drag type forces but does not apply to lift type forces. Even assuming (hypothetically) that the wind blew in a particular location continuously, no more than the Betz limit of the kinetic energy obtained in that year's wind may be extracted in keeping with common experience; however, this may be coincidence of the maximum possible with a three bladed conventional machine. In practice, most current systems do not reach a performance rate of even 50% of the Betz limit. The vast majority have typical rates of between 7% to 17% of the Betz limit.

A further noted disadvantage of modern wind turbine operation is that their relatively rapidly rotating rotor blades foul the surrounding air, making adding more blades not productive, and typically produce annoying sounds. Further, they may be a danger to flying animals, such as birds. For these and other reasons, conventional wind turbines are not practical or desirable for use in or near urban/suburban neighborhoods where the vast amount of power is consumed. Rather, they are typically placed in large groups (i.e., wind farms) at locations where they may be serviced efficiently and where they are exposed to higher velocity winds. As a result, they require extensive transmission systems to carry the generated electricity to where it is needed.

Further, for all prior art wind machines, their energy harvested does not increase faster than $D^2$, where D is the diameter of the blades. An additional major disadvantage of prior art wind turbines is that they operate of tip speed ratios (TSRs) of 6 or more, which requires that they must be located on exceptionally tall towers to reach not only faster moving winds but also to reach less turbulent winds. Consequently, they are recommended to be located a substantial distance (e.g., 500+ feet) from any obstructions, such as trees, buildings, or other wind machines in order to function properly. Further, with TSRs of 6 or more, should a wind gust come along and lower the TSR to, e.g., 5 or less, a conventional 3-bladed wind turbine typically will have flow separation and loss of power due to a micro-stall occurring as they have no mechanism of coarse tracking of the wind's speed nor limiting the range of possible attack gusts changing the attack angle of the apparent wind on their blades, thereby reducing the possible captured power.

Finally, and perhaps most importantly, the only harvestable energies with the modern wind turbine are from the tangential part of the lift forces. The normal part of the lift force, which works to cause the tower to tip over, is several times more powerful and is unutilized and wasted. Additionally, wind power is notoriously intermittent, necessitating costly investments in backup/gap filling power systems.

SUMMARY

The above and other disadvantages of the prior art are overcome by a toroidal lift force engine (TLE) in accordance with illustrative embodiments of the present invention. The toroidal lift force engine illustratively operates in a contained recirculating sealed pressurized gas (e.g., air, helium, carbon dioxide ($CO_2$), etc.) environment and utilizes the normal component of the lift forces to generate direct thrust with the tangential component to drive an axial flow compressor as well as the auxiliaries and speed control accessories. The toroidal lift force engine is illustratively comprised of two turbine assemblies that operate as a solid combination rotating structure in the pressurized gas environment.

The outer turbine is a high lift low drag (HLLD) lift turbine that captures lift forces to directly generate thrust as well as drive accessories from the rotation of the lift turbine blades in the gas. Illustratively, the gas is pre-rotated and orientated by a set of blades of an input stator before the gas impacts the blades of the lift turbine. A further set of blades of an exit stator work to calm and redirect the flow after passing through the lift turbine. Illustratively, the lift to drag ratio (L/D) for the lift turbine is greater than 1.

The second inner turbine part of this combination structure is an efficient axial flow compressor type turbine that works to provide the outer lift turbine with a steady stream of high velocity gas. The axial flow turbine illustratively also includes an input and exit stator having blades that are configured to help condition the gas prior to it entering the input stator of the lift turbine assembly.

In operation, the axial flow turbine works to provide a steady stream of gas to the lift turbine. Illustratively, the lift turbine assembly and the axial flow turbine assembly are configured in a continuous flow arrangement. That is, the exit flow of the gas from the axial flow turbine assembly flows into the input stator of the lift turbine assembly. Similarly, the flow exiting the output stator enters the axial flow turbine's input stator.

The toroidal lift force engine may be utilized to provide a thrust force independent of the surrounding atmosphere and/or the vehicle's speed in which it is mounted. By mounting a toroidal lift force engine in a vehicle, the thrust may be used to accelerate/decelerate the vehicle. Since this thrust force originates within a sealed enclosed casing (e.g., a toroid) it is independent of the outside atmosphere as well as the vehicle's speed. A vehicle equipped with such a toroidal lift force engine, accelerating continuously at approximately 1.0 g has the potential to reach the speed of light (c), theoretically, within approximately 11 months, as well as safely decelerating at the end of its journey, while accelerating at 3 g's would shorten this time to less than 4 months, etc. This assumes that it would have the fuel. Further, a toroidal lift force engine would operate equally well on the surface of a planet or in the void of outer space.

Illustratively, a toroidal lift force engine may be mounted in an aircraft. By directing the thrust forwards, the aircraft may be able to take off on a shorter runway than normal. Similarly, by directing the thrust towards the aft of an aircraft, deceleration may be aided, which may enable an aircraft to land on a short runway, field, etc. During normal flight operations, i.e., while cruising and not during takeoff or landing, an aircraft's main engine may be turned off, thereby saving substantial fuel costs, while the thrust generated by the toroidal lift force engine provides sufficient thrust for straight and level/cruising flight operations. A slightly more powerful unit, but not necessarily larger one, could replace the main propeller driving engine altogether. An even more powerful unit would render atmospheric interacting wings, tails, stabilizers as well as landing gear, etc. as redundant appendages. If this thrust force is greater than the gross weight of the vehicle, it can of course, accelerate to outer space and beyond.

It is noted that a natural outer shape for the ultimate vehicle using an exemplary toroidal lift force engine is a symmetrical, saucer type shape. Such a shaped vehicle could, e.g., accelerate at 1 g for half the distance to its destination, and then rotate 180° before decelerating the balance of its journey. Such a maneuver would maintain the g forces in the same direction for the comfort and long-term health of its occupants. Another example of the capabilities is for the vehicle to be able to rotate approximately 135° at a high speed in an atmosphere before making a high-speed right angle course correction turn. A vehicle so equipped, need not accelerate to Earth's escape velocities of approximately 25,000 miles per hour to reach outer space. Instead, a vehicle could transit straight upward and hover like a helicopter does in the atmosphere. This would eliminate the need for weighty heat shielding, etc. Once hovering, the vehicle could then accelerate and decelerate to its destination.

Further, the rotation of the lift turbine of a toroidal lift force engine may be used to power a pump configured to pump a fluid, such as hydraulic fluid, which may be used to power heat exchangers, generators, etc. In this manner, a toroidal lift force engine may be used to power a home, or other structure, with electricity, hot water, heat, and/or air conditioning. The three-dimensional toroidal shape is seemingly ideal for this task and is the most suitable shape found so far, as it is desirable to have the mean blade velocity in the lift turbine to be approximately 2 to 6 times the velocity of the gas flowing through it. Illustratively, at the same time the speed of the same gas through the axial flow turbine will be approximately 1:1 with its mean blade velocity, all without resorting to noisy, inefficient, costly, and problem prone gears.

BRIEF DESCRIPTION OF THE DRAWINGS

The above and further advantages of the present invention are described in connection with the accompanying drawings in which like reference numerals indicate identical or functionally equivalent elements:

FIG. 20A is a forward view of exemplary blades for an exit stator, and adjustable axial blades in accordance with an illustrative embodiment of the present invention;

FIG. 20B is a cross-sectional view of exemplary blades for an exit stator in accordance with an illustrative embodiment of the present invention;

DETAILED DESCRIPTION OF AN ILLUSTRATIVE EMBODIMENT

Figure 1:
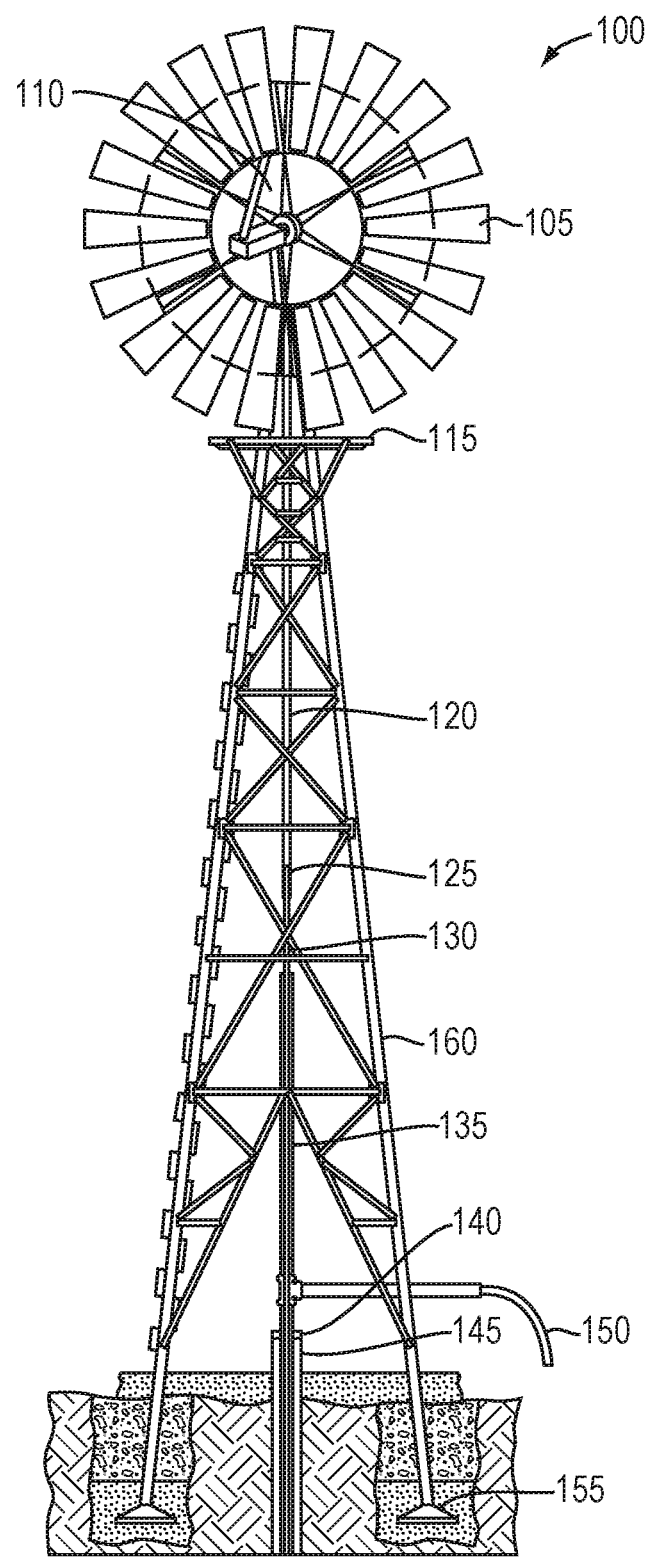
FIG. 1, previously described, is a front view of an exemplary farm windmill as is known in the prior art.
Figure 2:
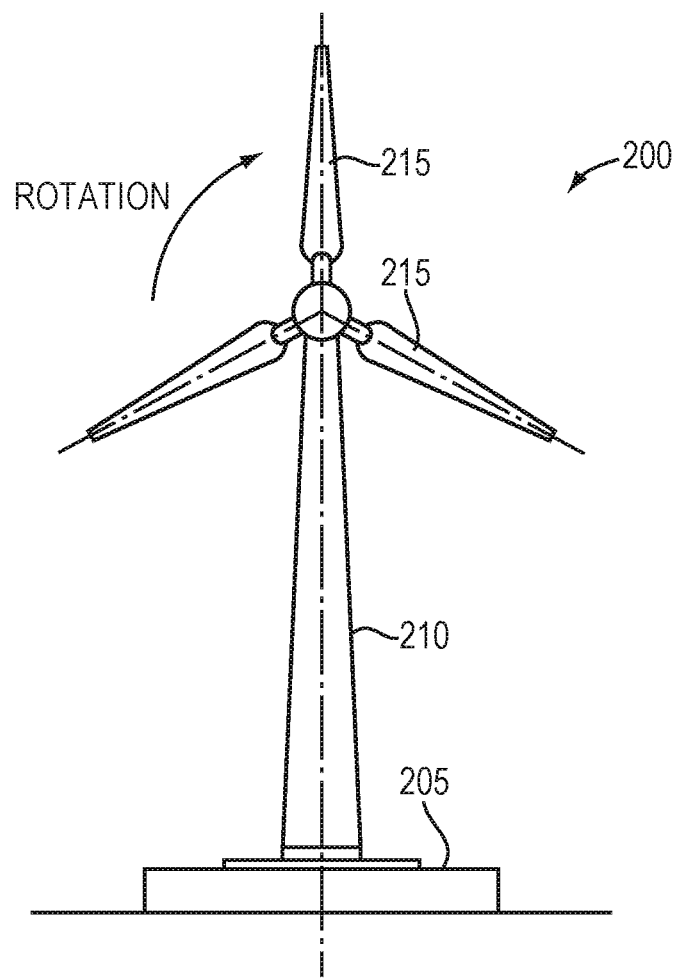
FIG. 2, previously described, is a front view of an exemplary three-bladed wind turbine as is known in the prior art.

As noted above, Betz's Law conventionally states that the maximum efficiency of all machines designed to extract energy from a flowing stream (wind, water, or other fluid) is limited to 16/27 or approximately 59.3% of its kinetic energy by claiming that this is demanded by the law of conservation of energy. While Betz's Law appears to apply to existing machines, this appearance is coincidental and not causal. As noted above, conventional three bladed wind machines harvest, at best, approximately 6% of the total lift forces developed and 0% of the normal forces. The best or most efficient machines from low wind speeds up to approximately 18 miles an hour is still an old farm windmill, described above in relation to FIG. 1.

Typical farm windmills will rotate out of the wind stream at speeds above approximately 18 miles an hour. The blades on farm type windmills also harvest only a portion of the tangential component of the lift forces and are typically set at an approximately 45° angle for good start up torque with their speed regulated by the size of the pump load. When the blade speed exceeds the wind speed, the blades back wind and stall, thereby preventing the machine from ever reaching higher TSR's and resulting higher power levels. Machines with blades set for higher TSR's will not start up, failing to reach operating speeds, mainly because of turbulent nulls, which causes back winding of the blades. The illustrative toroidal lift force engine of the present invention utilizes the normal component of the lift force as well as the tangential component to harvest a greater amount of energy from a flowing fluid, thereby resulting in a more efficient machine than conventional farm windmills and/or modern three bladed wind turbines.

Conventional and farm windmill type machines are limited to the local atmospheric density, velocity, and frequency of occurrence conditions, where power is proportional to the air's density times the apparent wind velocity cubed. The toroidal lift force engine, operating according to these same rules, can well operate 24/7/365 indefinitely, but have an energy density that may be millions of times that of its atmospheric cousins. For example, instead of exemplary average wind speeds of approximately 10 MPH at one atmosphere pressure, the toroidal sealed pressurized engine, can operate continuously at approximately 1,000 MPH and 100 atmospheres which yields a power density $100^3$ x's $10^2$ or $10^8$ times, e.g., 100,000,000 times any atmospheric engine. Consequently, the toroidal lift force engine designer can readily reduce its diameter by approximately two orders of magnitude, $10^4$, over the environmentally limited engines' size and still have an abundant power and thrust force source that can meet needed demands.

Specifically, Betz's law is based on a simplified version of the Bernoulli Equation that is expressly only for incompressible non-rotational flows. This is a reasonable assumption for most conventional windmills. As will be appreciated by those skilled in the art, the validity of the Betz limit assumes that the Bernoulli Equation applies. It should be noted that Bernoulli himself said that it does not apply to wind turbines experience decidedly rotational flow. However, a toroidal lift force engine made in accordance with various embodiments of the present invention creates and enhances highly rotational flows, which augment and reinforce the normal and tangential lift forces that are generated. Lift forces, which were not known in Bernoulli's or Newton's time, may be utilized to harvest a significantly greater amount of energy from the wind.

Figure 3A:
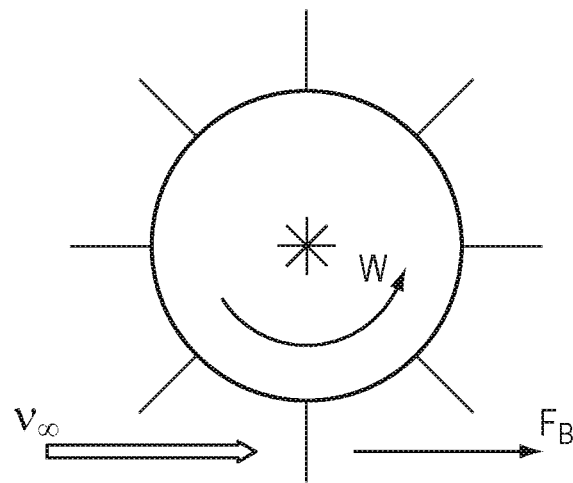
FIG. 3A is a diagram illustrating the Bernoulli force with a rotating device.

FIG. 3A is in exemplary diagram illustrating the Bernoulli force in accordance with an illustrative embodiment of the present invention. As illustrated in FIG. 3A, the wind (or other fluid) $V_\infty$ engages a lever arm of a rotational device, such as a waterwheel. In such an environment, the fluid flow is transferred to rotational movement W. More generally, $V_\infty$ interacts with a lever arm and applies $F_B$, i.e., a drag force, to the arm, which is translated into rotational movement. This is an example of the conversion of kinetic energy to potential energy and Newton's $3^{rd}$ Law.

Figure 3B:
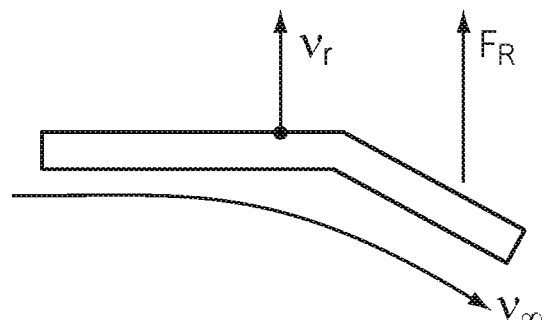
FIG. 3B is a diagram illustrating reaction force with an angled surface.

FIG. 3B is an exemplary diagram illustrating the reaction force, i.e., momentum exchange, in accordance with an illustrative embodiment of the present invention. As illustrated in FIG. 3B, fluid flow ($V_\infty$) causes a reaction force $F_R$ when the fluid interacts with an angled surface causing it to rotate/move at velocity $V_r$. This exchange forms the basis of conventional windmills and/or wind turbines. Bernoulli specifically excludes the applicability of his theory to devices of this type.

Figure 3C:
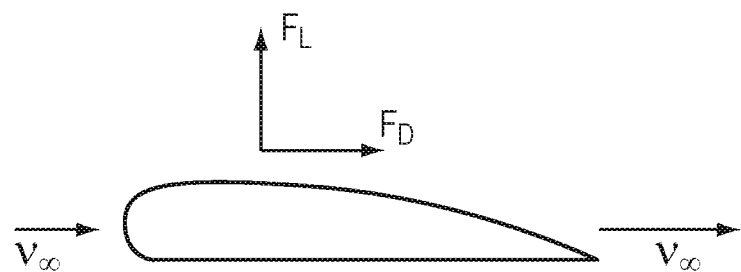
FIG. 3C is a diagram illustrating lift force over a blade.

FIG. 3C is a diagram illustrating lift forces in accordance with an illustrative embodiment of the present invention. As illustrated in FIG. 3C a fluid flows ($V_\infty$) over a shaped blade at a particular attack angle ($\propto$) that generates lift forces $F_L$ at right angles to the flow $V_\infty$. Drag force $F_D$ is also generated from the fluid impacting the blade. However, in typical embodiments the lift forces $F_L$ are substantially greater than the drag forces $F_D$ by a factor of at least 30 to 1 ($F_L/F_D \geq 30:1$). For example, Dr. Robert Liebeck has developed shaped blades, such as his Douglas/Liebeck LNV109A shape, that reportedly have L/D ratios exceeding 150:1.

An exemplary toroidal lift force engine of the present invention illustratively utilizes lift forces to generate substantially more power density than a conventional wind turbine that only uses Bernoulli and/or reaction/drag forces. Further, the generation of lift forces creates an asymmetric pressure distribution on the blade as well as Newton's momentum exchange. Conventional wisdom does not normally, if ever, differentiate these two, but my toroidal lift force engine almost exclusively utilizes the forces from this asymmetrical pressure distribution. Lift force was unknown and not predicted by either Bernoulli or Newton. They provided no guidelines on what energies may be extracted from a system using asymmetrical pressure distribution lift forces.

Figure 4:
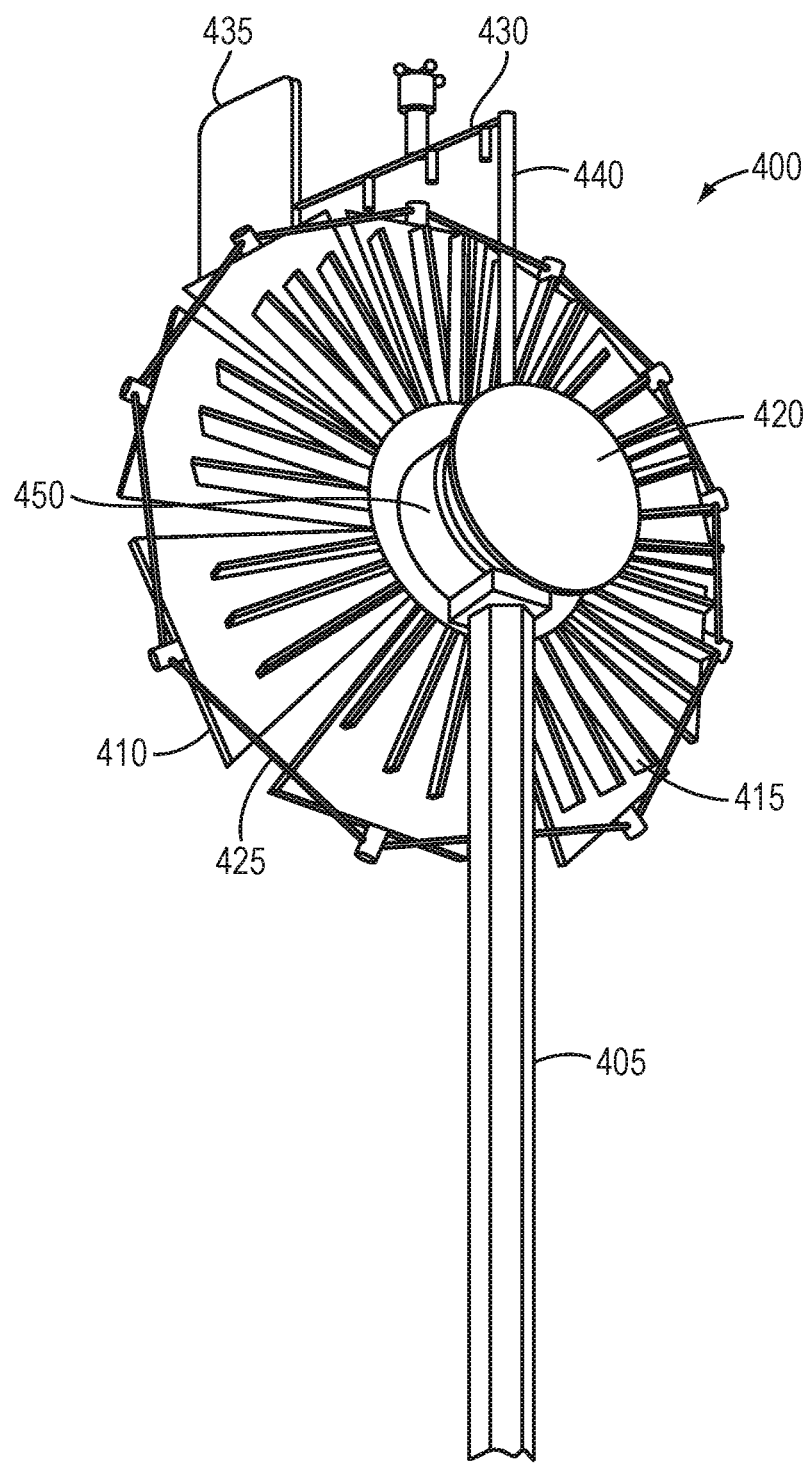
FIG. 4 is a perspective view of an illustrative horizontal axis lift turbine (HALT) in accordance with an illustrative embodiment of the present invention.

FIG. 4 is a perspective view of an exemplary horizontal axis lift turbine (HALT) 400 that illustrates certain features of a toroidal lift force engine (TLE) in accordance with an illustrative embodiment of the present invention. Illustratively, the HALT 400 exemplifies the advantages of pre-rotating and orientating a counter-rotating flow using stationary blades prior to the flow impacting rotating blades. This counter-rotating and oriented pre-rotation compresses the range of the possible angles of attack of the flow (a) on the rotating blades and serves to avoid stalls should a momentarily lull in the flow occur and which appears to contradict the universality of Newton's Third Law.

The HALT 400 is illustratively supported at an elevated position by a tower 405. The exemplary tower 405 may be supported by a variety of types of bases in accordance with various alternative embodiments of the present invention. In one embodiment, the tower 405 may be anchored to a base (not shown) that is permanently fixed. In an alternative embodiment of the present invention, the tower 405 may be anchored to a pivoted base (not shown) that enables the tower to be moved between a raised position and a lowered position. An exemplary pivoted base may enable ease of maintenance, replacement, and/or repairs by enabling the HALT 400 to be lowered to a position closer to the ground. As will be appreciated by those skilled in the art, such a pivoted based would obviate the need for ladders or other lifting mechanisms to enable, for example, access to elements of the HALT for repair/maintenance purposes.

The HALT 400 illustratively comprises of a nacelle 450 that supports a nose dish 420, a plurality of rotating blades 410, a plurality of fixed blades 415, and a tail component 435. In addition to the rotating blades 410 and fixed blades 415, an exterior support structure 425 links the outer edges of each of the rotating blades 410. Illustratively, the support 425 provides additional structural stability to the rotating blades 410. The tail component 435 is illustratively supported by a lateral support 430 that is operatively interconnected with a pole support 440. It should be noted that in alternative embodiments of the present invention, a HALT 400 may comprise additional and/or differing arrangement of components. As such, the description contained herein of specific components should be taken as exemplary only.

The nacelle 450 is illustratively mounted to tower 405 so that it may rotate. As will be appreciated by those skilled in the art, various mechanisms, e.g., a bent axis positive displacement high efficiency hydraulic pump/motor capable of high speeds (not shown), etc., may be mounted in the nacelle 450 and operated by rotation of blades 410. One of the major insights in developing the exemplary HALT machine was the discovery of a simple automatic technique of getting the working blade rotor 410 to regularly and automatically track the wind speed in real time in a linear fashion, by use of an exemplary simple needle valve in a closed loop control circuit, such as that disclosed below in FIG. 16.

The power of the wind varies as the cube of its velocity. If there is some device in its closed loop hydraulic control circuit which has a pressure drop proportional to the square of the fluids' velocity through it, which an orifice or needle valve readily and precisely does over an extended temperature range, the working blades rotor will/does track the wind speed in a linear fashion (1:1). Combined with a positive displacement hydraulic pump, the hydraulic fluid flow rate directly correlates in a linear fashion to the winds' speed. With the slow turning, large rotor of the HALT, it is quite easy to observe that it works very well at all wind speeds to control the wind's angle of attack on the blades. Illustratively, the HALT machine will not function properly without it. The same system of closed loop control is used on the exemplary toroidal lift force engine described herein.

As noted above, the nacelle 450 of the HALT is illustratively mounted on the tower 405 in a manner so that it may rotate to face the wind. In operation, the tail component operates to direct the rotating and fixed blades into the direction of the wind. Due to the robust design of the HALT and its control system, there is no need for the blades to rotate out of the wind at high wind speeds. Should the HALT experience the onset of ultrahigh winds, such as typhoons and/or hurricanes, the entire machine can be automatically and remotely lowered to the ground to be housed and protected. Such lowering may be accomplished by, for example, having a remotely controlled tower, by having a hinged tower that enables the assembly to be lowered, etc. Further, momentary gusts or drops in wind speed will not cause a loss of rotation as often occurs in prior art windmills or wind turbines. In accordance with illustrative embodiments of the present invention, the rotational system may include a braking and/or locking mechanisms to cause the tower mounted components to be fixed in a particular location. This may be necessary, e.g., for maintenance purposes, or if the tower is foldable to ensure that when the tower is lowered to the ground various components of the HALT are not damaged by impacting the ground. However, as will be appreciated by those skilled in the art, in accordance with alternative embodiments of the present invention, no braking or other locking mechanism is utilized. As such, the description of a braking/locking mechanism should be taken as exemplary only.

In operation, the stationary blades 415 cause a counter-rotating oriented pre-rotation of the wind prior to interacting with rotating blades 410. Illustratively, this counter-rotating pre-rotation compresses the possible angles of attack of the wind or other fluid as it interacts with the rotating blades 410. This aims to provide a better more continuous lift force as well as prevent momentary stalls of the rotating blades due to lulls and/or spikes in the wind.

Figure 5:
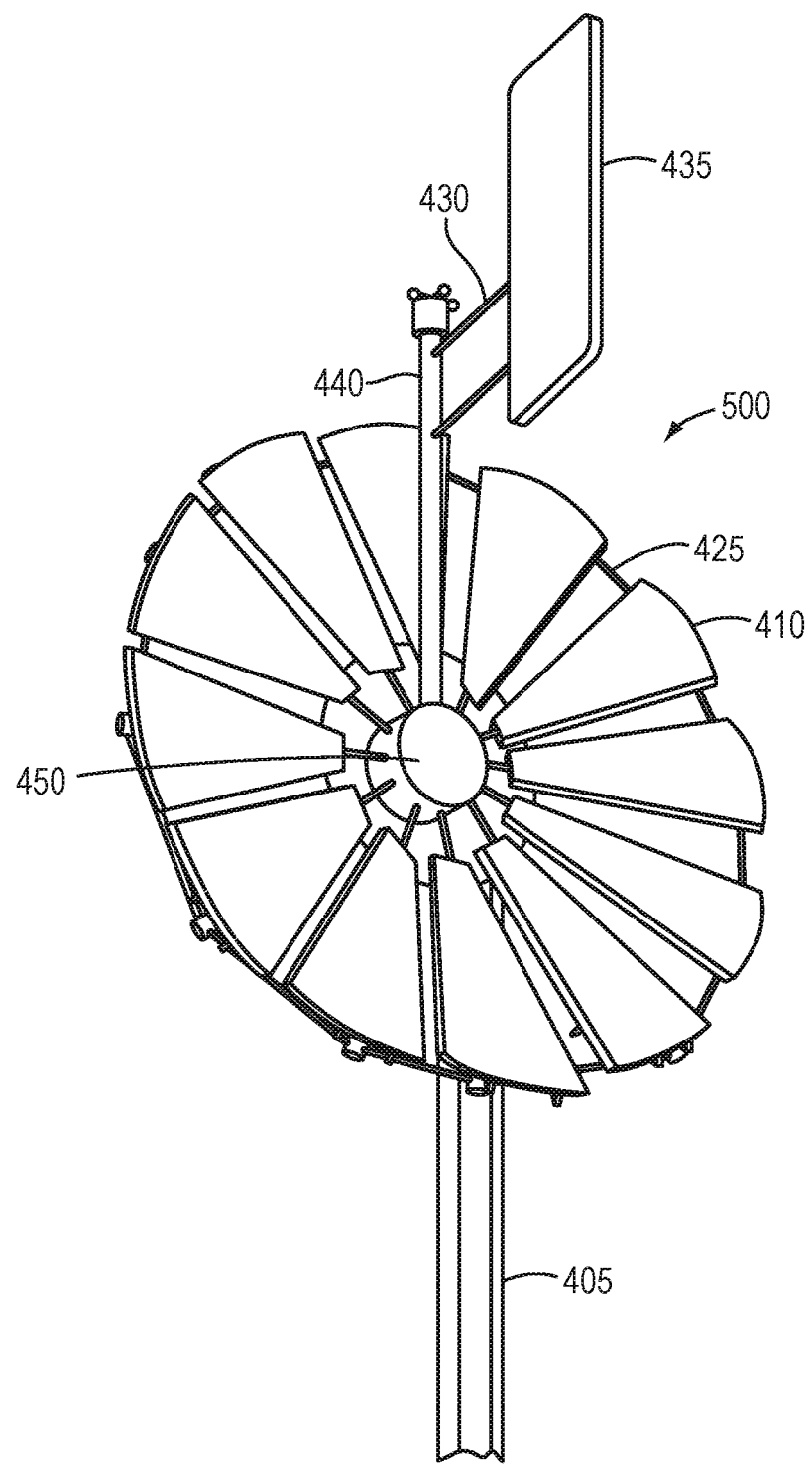
FIG. 5 is a rear perspective view of an exemplary HALT in accordance with an illustrative embodiment of the present invention.

FIG. 5 is a rear view 500 of an exemplary HALT 400 in accordance with an illustrative embodiment of the present invention. View 500 illustrates the top portion of tower 405 and a view of the rear of the rotating blades 410 and support 425. Pole support 440 and lateral support 430 are illustrated as well as the tail component 435.

One major difference between an exemplary HALT as compared to a conventional wind turbine or other turbines, such as a jet engine and/or steam turbine, is that the rotating blades 410 rotate into the flow of the wind or other fluid in apparent violation of Newton's Third Law. A jet, or gas engine, or other conventional turbine, such as the universally used steam power turbine, always rotates with the flow. As it is a reaction or impulse machine, its rotation is invariably at slower speeds than the flow. This is in distinction to the toroidal lift force engine's turbine which always rotates at several times the velocity of its oncoming flow. In effect, it is "making its own wind." This pre-rotation of the fluid prior to impacting the rotating blades 410 helps to generate additional lift from the blades, as well as compresses the possible range of $\alpha$, the wind attack angle.

Figure 6:
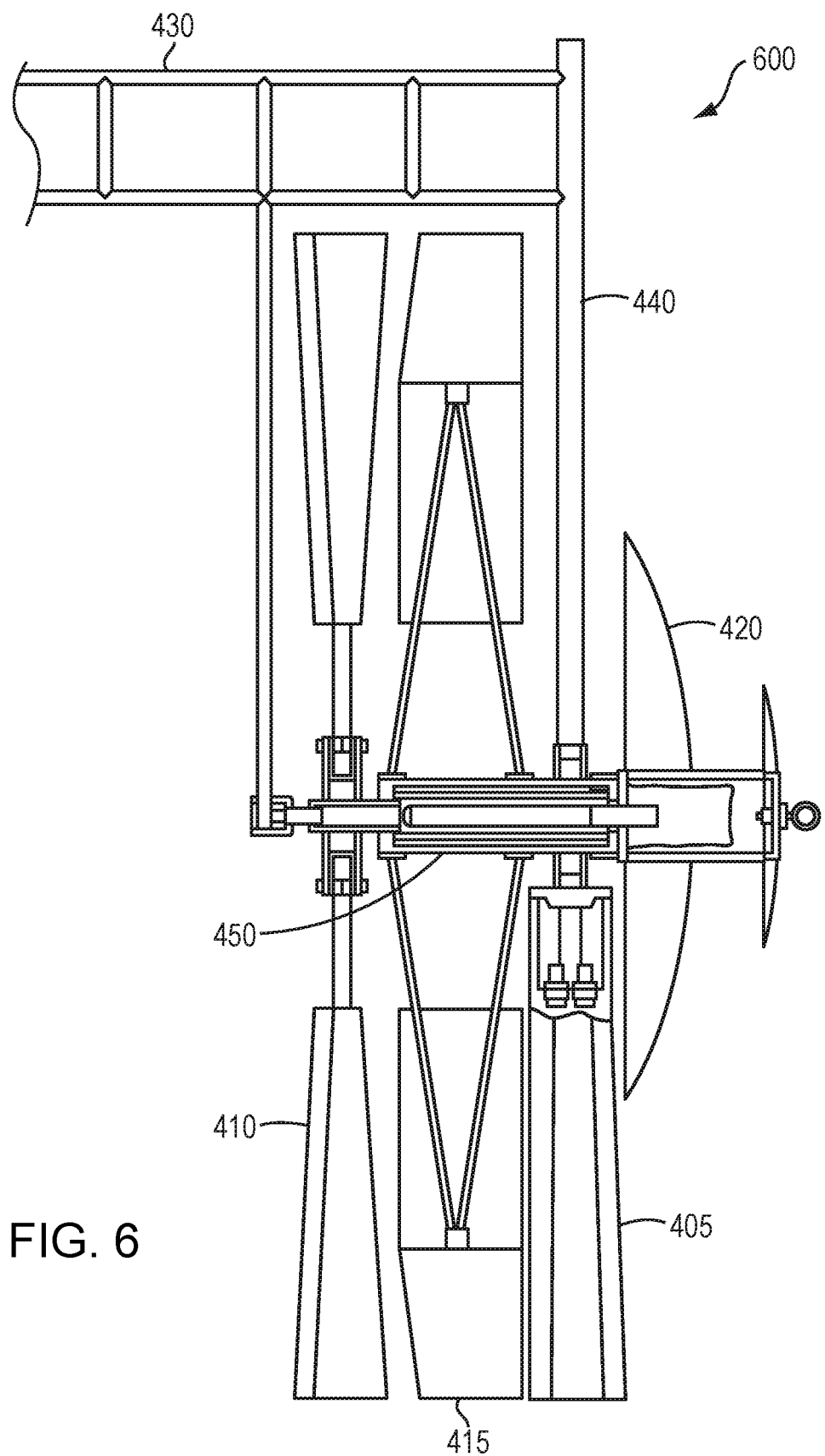
FIG. 6 is a side view of an exemplary HALT in accordance with an illustrative embodiment of the present invention.

FIG. 6 is a cross-sectional view 600 of an exemplary HALT in accordance with an illustrative embodiment of the present invention. Tower 405 is shown that supports a nacelle 450 that supports including fixed blades 415, rotating blades 410 as well as the tail structures 430, 435. The internals of the nacelle 450 are not shown. Nose dish 420 is mounted along a central axis of the HALT 400. Lateral support 430 as well as the pole support mechanism 440 are also illustrated. It should be noted that in accordance with an illustrative embodiment of the present invention, the rotating and fixed blades are disposed behind the tower 405 when viewed from the direction of the wind (or other fluid). However, it should be noted that in alternative embodiments the fixed and/or rotating blades may be situated in front of tower 405. Further, in alternative embodiments the rotating blades may be behind and the stationary blades may be in front of tower 405. As such, the description contained herein of fixed blades 415 and rotating blades 410 being located behind tower 405 should be taken as exemplary only.

Figure 7:
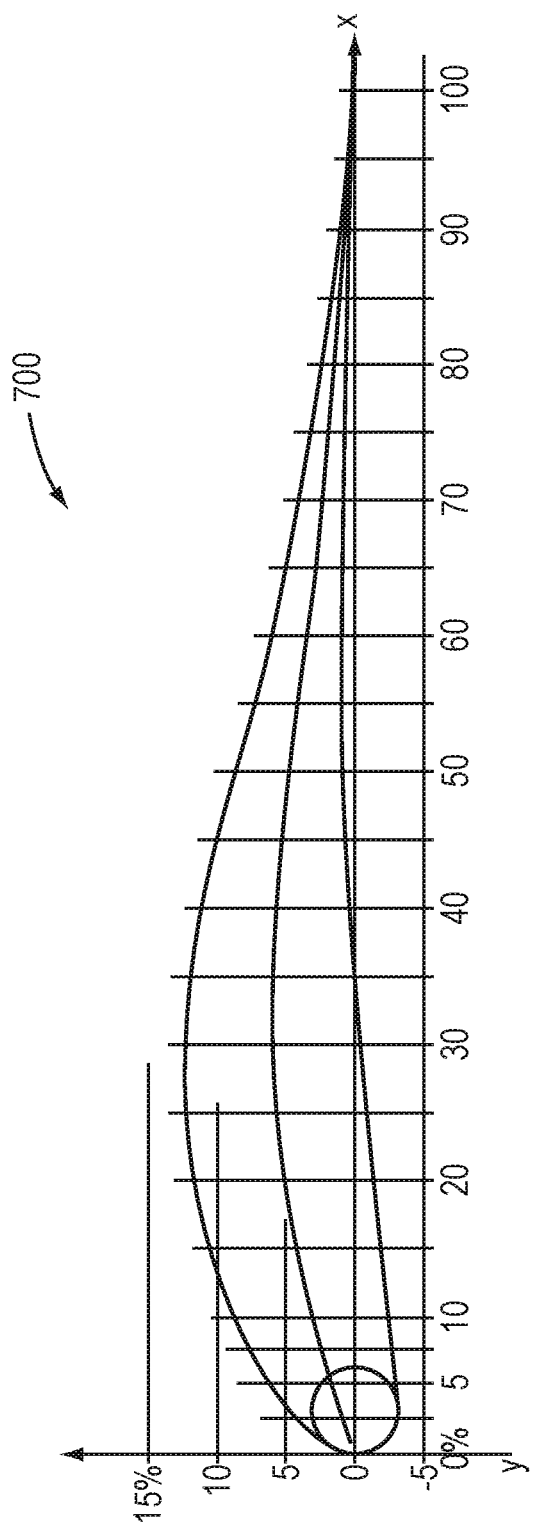
FIG. 7 is a cross-sectional view of an exemplary HALT blade in accordance with an illustrative embodiment of the present invention.

FIG. 7 is a cross-sectional view 700 of an exemplary rotating blade that utilizes Dr. Robert Liebeck's LNV109A High Lift/Low Drag airfoil that may be utilized in accordance with an illustrative embodiment of the present invention. This particular blade profile is thought appropriate as it has minimal aft concavity, which indicates that its high lift characteristics have more to do with asymmetrical pressure distribution rather than Newton momentum exchange down drafts. Illustratively, a rotating blade having the cross-section shown in view 700 may be utilized with a HALT, as described above in reference to FIGS. 4-7, or in a toroidal lift force engine, as described further below. It should be noted that in alternative embodiments, differing cross sections may be utilized to achieve desired benefits. Therefore, the cross-section shown in view 700 should be taken as exemplary only and not limiting.

Chart 1 illustrates the dimensions based on percentages of an exemplary rotating blade chord in accordance with an illustrative embodiment of the present invention.

| Chart 1 | | |
|---|---|---|
| NOSE RAD 3.22% of C (C = Chord, t = thickness) | | |
| X/C % | ±Y/C % | ±t/C % |
| 2.5 | .60 | 3.70 |
| 5.0 | 1.56 | 4.72 |
| 7.5 | 2.39 | 5.18 |
| 10 | 3.13 | 5.63 |
| 15 | 4.32 | 6.21 |
| 20 | 5.15 | 6.48 |
| 25 | 5.73 | 6.53 |
| 30 | 6.04 | 6.38 |
| 35 | 6.00 | 6.00 |
| 40 | 5.73 | 5.33 |
| 45 | 5.20 | 4.63 |
| 50 | 4.67 | 3.91 |
| 55 | 4.06 | 3.28 |
| 60 | 3.53 | 2.71 |
| 65 | 2.92 | 2.19 |
| 70 | 2.37 | 1.68 |
| 75 | 1.82 | 1.29 |
| 80 | 1.33 | .92 |
| 85 | .88 | .63 |
| 90 | .52 | .39 |
| 95 | .21 | .21 |
| 100 | .00 | .00 |

Figure 8A:
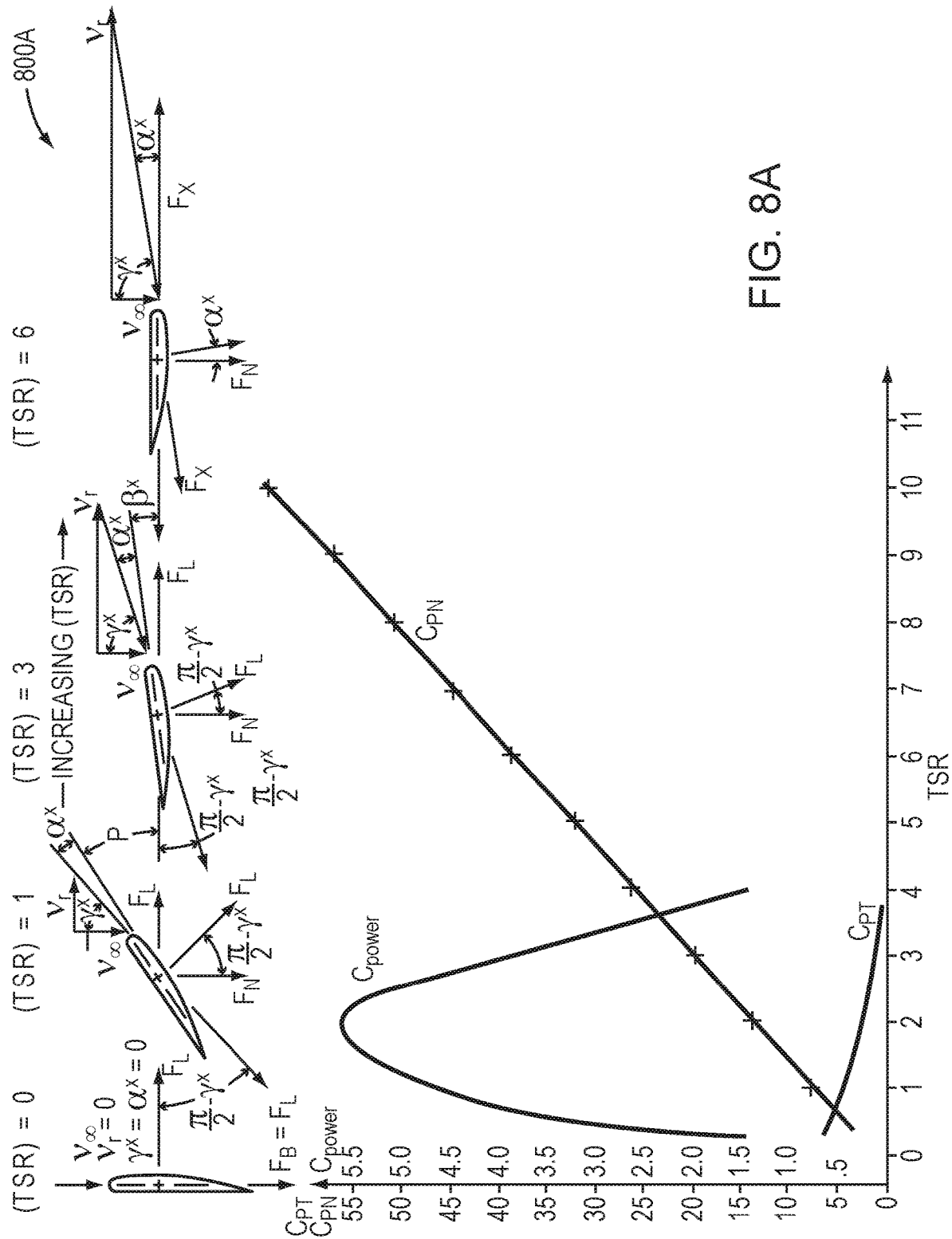
FIG. 8A is an exemplary chart illustrating the relationship among power torque and the distribution of lift force into the normal and tangential components with tip speed ratio (TSR) in accordance with an illustrative embodiment of the present invention.

FIG. 8A is a chart of a detailed mathematical analysis illustrating the general tangential and normal components of the lift/drag forces on all aeronautical shapes and how these shapes must orientate to maintain a working angle of attack at various TSR's, from a TSR of zero to a TSR of approximately 6. This model is in accordance with an illustrative embodiment of the present invention. As shown in FIG. 8A, illustratively, the shape must rotate clockwise from a vertical position, shown at the upper far left corner, at zero TSR, to a horizontal orientation at a TSR of 6 at the far upper right corner. The normal component of the lift force steadily rises as the tip speed ratio (TSR) increases, but the tangential component, which is illustratively an order of magnitude smaller, goes steadily to zero when the TSR equals the L/D ratio. The power output of the tangential portion has a peak at approximately half the maximum TSR, which then declines as the TSR increases, while the power output of the normal portion, if harvested, always increases with TSR. Similarly, torque on the blades, which is the tangential component, decreases with TSR and goes to zero at approximately TSR=L/D.

Figure 8B:
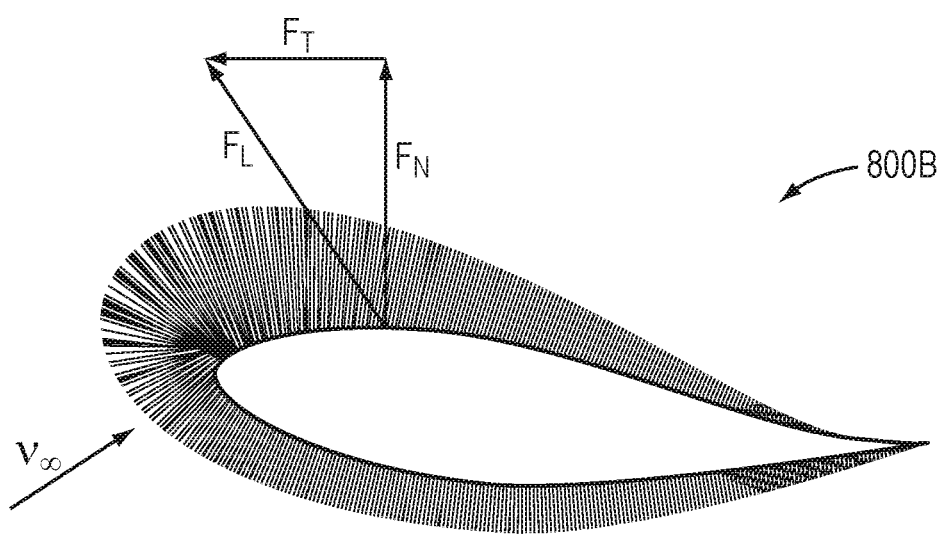
FIG. 8B is an illustration of an exemplary lift force blade's pressure distribution in accordance with an illustrative embodiment of the present invention.

FIG. 8B is a diagram illustrating the asymmetrical nature of the lift forces on a blade detailing its tangential and normal components in accordance with an illustrative embodiment of the present invention.

Figure 9A:
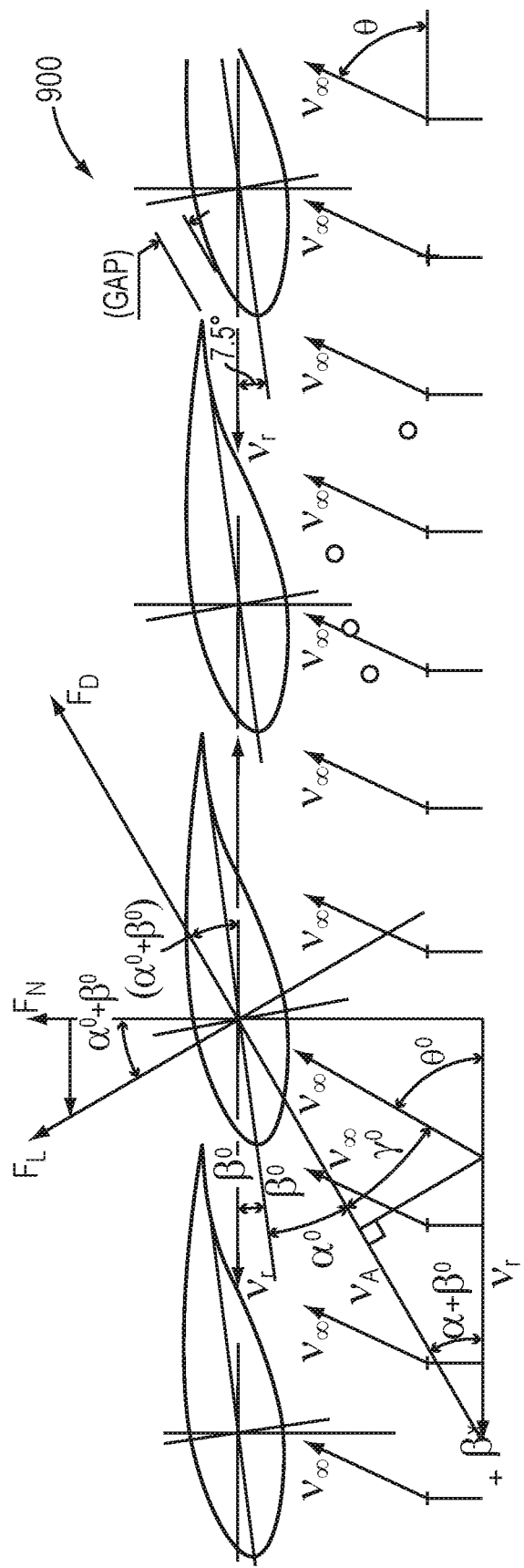
FIG. 9A is an exemplary diagram illustrating blade layout in accordance with an illustrative embodiment of the present invention.

FIG. 9A is an exemplary blade layout used on both the HALT and the toroidal lift force engine, showing exemplary blade positions and orientations of various components. The blades do not necessarily have to overlap, but their flows do, as the flow from the trailing edge of one works to energize the boundary layer of its succeeding blade, at the very area where it is most likely to separate at high angles of attack, allowing it to function at these higher attack angles. Conventional wisdom would, and does, indicate that in order for this circular blade array to exhibit a normal lift forcer in the observed direction, downstream of the oncoming flow, that the resultant downdraft would/must reverse back upon itself, which is a clear absurdity.

Figure 9B:
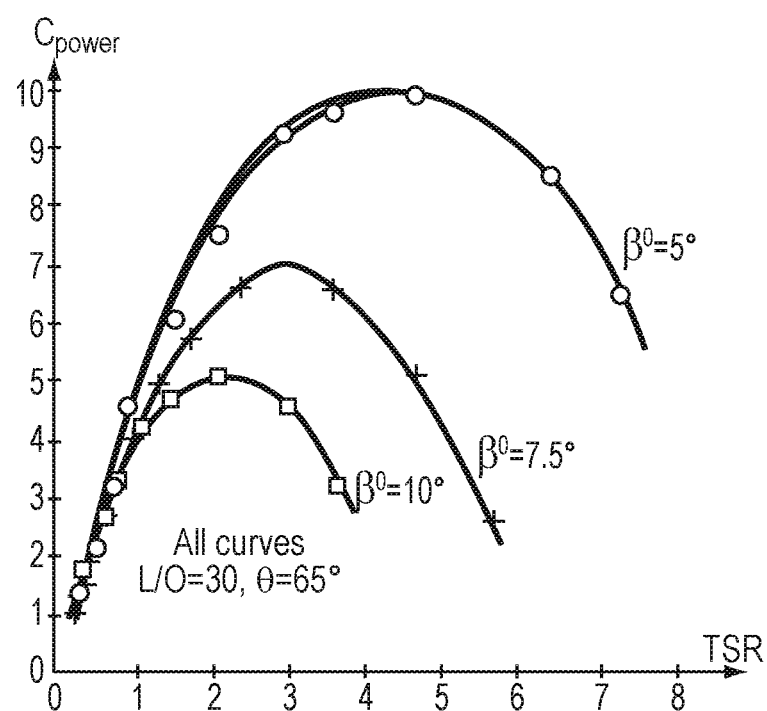
FIG. 9B is an exemplary chart illustrating the relationship between TSR and power in accordance with an illustrative embodiment of the present invention.

FIG. 9B is a graph of the influences on the various angles involved in the blade layout to the Coefficient of Power, ($C_{power}$) for both the HALT and the toroidal lift force engine blade layout in accordance with an illustrative embodiment of the present invention.

Figures 10A, 10B:
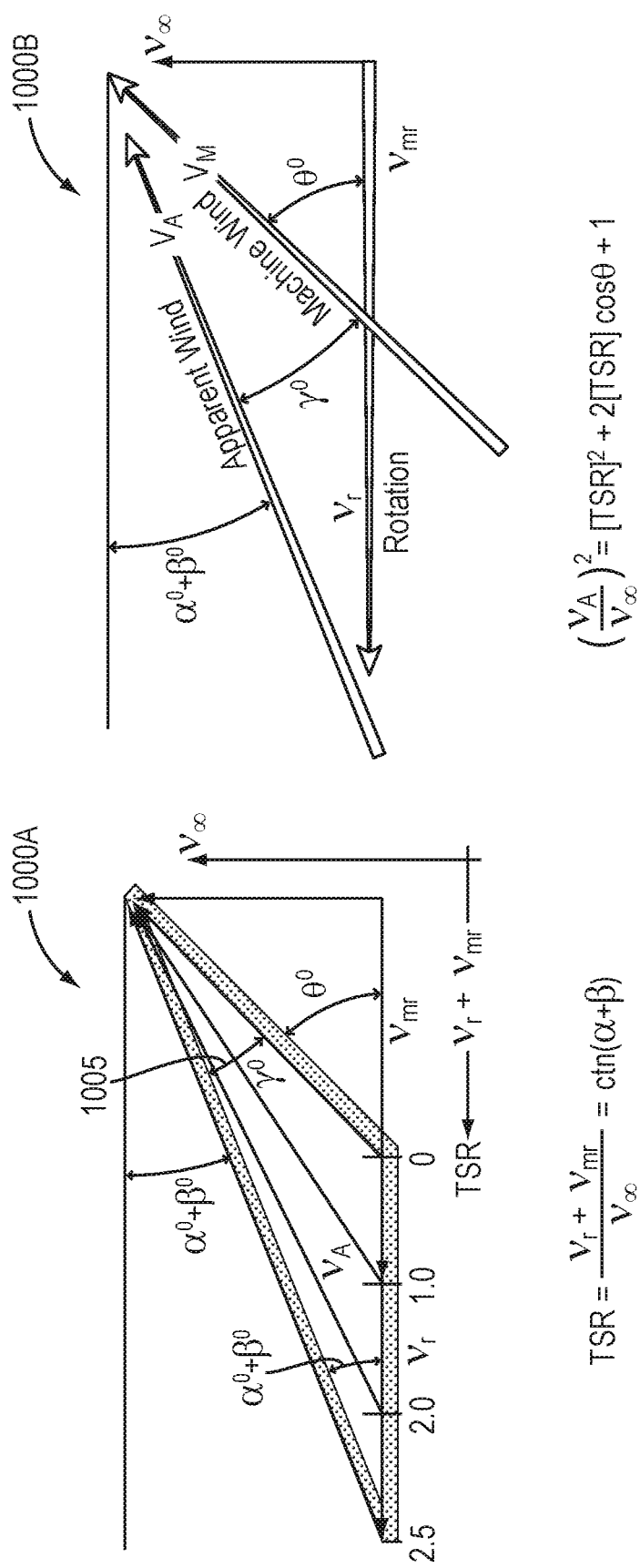
FIG. 10A is an exemplary force diagram for a golden triangle and compression of alpha (a) the angle of attack, in accordance with an illustrative embodiment of the present invention.
FIG. 10B is an exemplary force diagram of a lift turbine blade in accordance with an illustrative embodiment of the present invention.

FIG. 10A is a diagram illustrating an exemplary Golden triangle showing the compressed range of the attack angle alpha ($\propto$) in accordance with an illustrative embodiment of the present invention.

FIG. 10B is a diagram illustrating how the apparent wind is enhanced by the redirected machine wind when used with a blade as described herein in accordance with an illustrative embodiment of the present invention.

Figure 11:
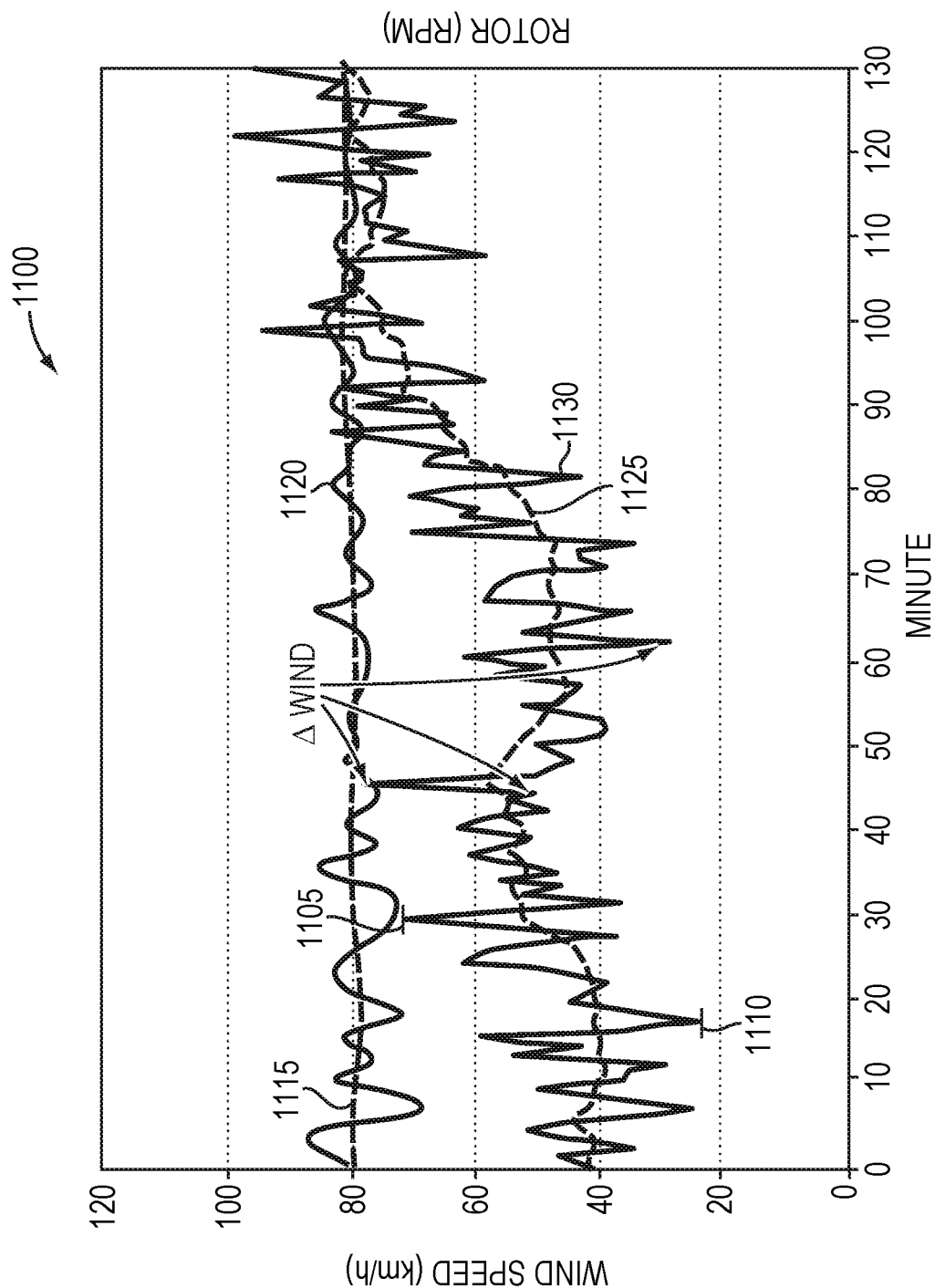
FIG. 11 is a chart illustrating momentary spikes and lulls in wind speed in accordance with an illustrative embodiment of the present invention.

FIG. 11 is a chart 1100 illustrating changes in rotor speed verses micro wind. The line 1115 represents a typical older three bladed conventions turbine, line 1120 near it represents a more modern version. The lower curves are that of a toroidal lift force engine or HALT in accordance with an illustrative embodiment of the present invention. Illustratively, the x-axis is linear time, while the y-axis is a wind speed in kilometers per hour (km/h). The lower chart illustrates wind speeds for both machines measured at fractional minute intervals (solid line) 1130 while the dotted line 1125 around it represents the HALT mean machine rotor speed (dashed line). Momentary spikes, such as exemplary spike 1105, may invoke blade stall and lulls, such as exemplary lull 1110, may invoke a blade back wind event in both machines. These changes, in the momentary wind, aka A Winds may put a conventional wind turbine into a momentary stall or cause a windmill or turbine to stop. The recovery of such a stall or stop may take on the order of one or more seconds. By the time such a recovery has occurred, a new micro wind event (e.g., spike or lull) may have occurred, which may result in further stalls, preventing the rotor from ever getting up to speed, causing a significant reduction in captured power. As can be readily seen, the HALT follows more closely the actual micro wind speed. Conventional wisdom theory would say that this full blade array cannot work and would ascribe this non-functioning to be due to the full array overlapping blade layout blocking the blade's "downdraft;" however direct empirical observation and power measurements of the tangential lift force output of the HALT clearly disputes this notion.

The principles of the present invention may be utilized to overcome such problems with micro wind events. By pre-rotating and properly orientating the flow of the wind (or other fluid) prior to impacting with the rotating blades, the maximum possible excursions of the wind attack angle upon the blades is compressed, preventing momentary lulls in the speed of the fluid to negatively affect the rotation of the turbine, e.g., a HALT or toroidal lift force engine in various exemplary embodiments of the present invention works smoothly, despite always present local wind turbulences.

Chart 1100 also illustrates an exemplary rotor revolutions per minute of an exemplary turbine. Illustratively, the RPM of the rotor may have momentary changes 1120, but overall maintains a substantially constant rate.

Figure 12:
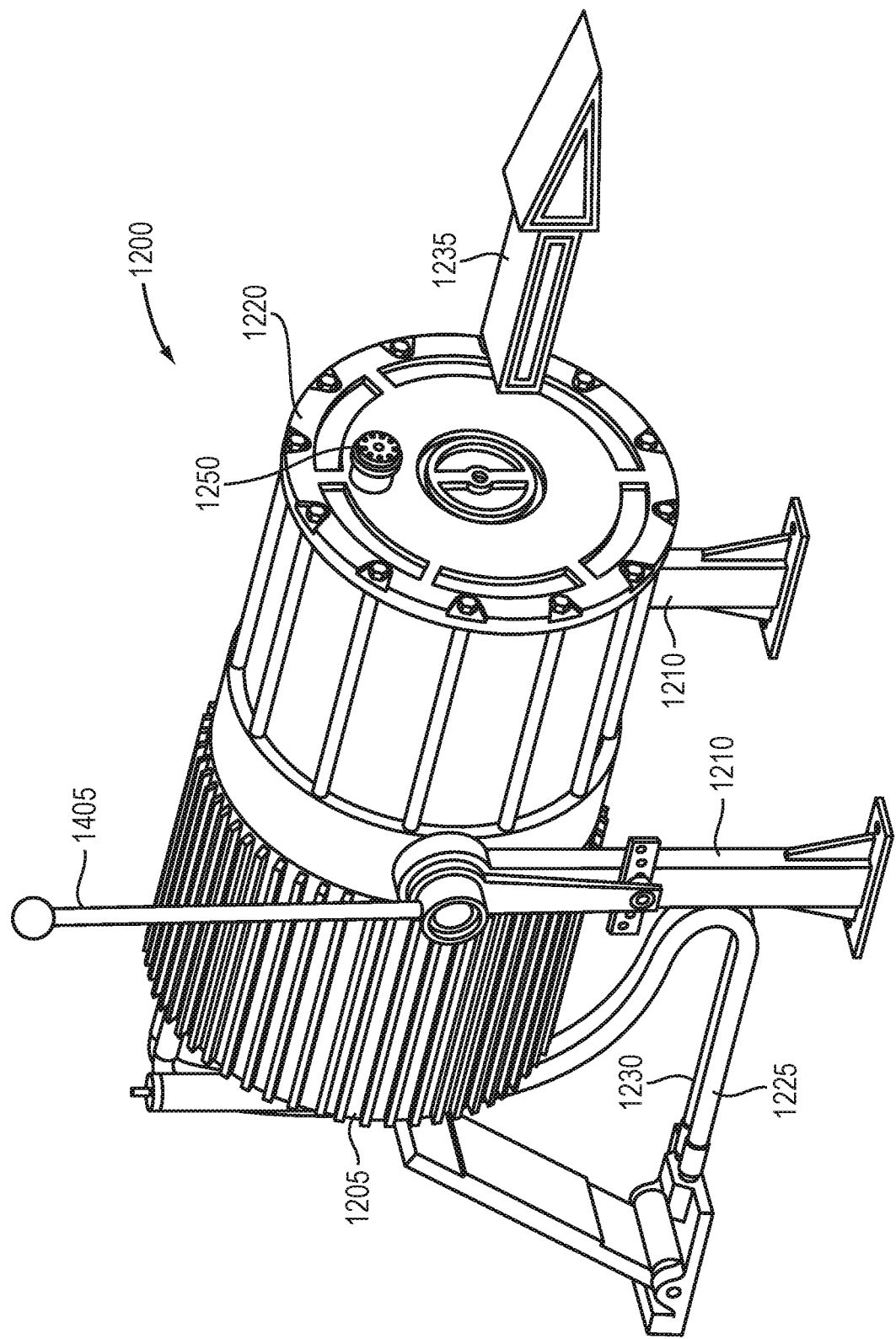
FIG. 12 is a perspective view of an exemplary toroidal lift force engine (TLE) in accordance with an illustrative embodiment of the present invention.

FIG. 12 is perspective view of an exemplary toroidal lift force engine 1200 in accordance with an illustrative embodiment of the present invention. Exemplary toroidal lift force engine 1200 comprises of an exterior housing 1205 that is illustratively supported by a pair of supports 1210. It should be noted that in accordance with an illustrative embodiment of the present invention, a pair of supports 1210 are shown and described; however, in alternative embodiments of the present invention, a differing number of supports 1210 may be utilized. As such, the description of a pair of supports 1210 should be taken as exemplary. The inner components of toroidal lift force engine 1200 is shown and described further below, in reference to FIG. 15. In accordance with an illustrative embodiment of the present invention, the toroidal lift force engine is filled with a pressurized gas, e.g., air, helium, carbon dioxide ($CO_2$), etc., that works to amplify the thrust generated by the lift turbine. For example, the use of super critical $CO_2$, which is approximately 400 times denser than air at near room temperature and approximately 1100 psi will provide a noted boost of power as compared to the use of normal air at one atmosphere pressure and the same temperature. In an illustrative embodiment the pressurized gas has a pressure of approximately 1 atm, 14.5 psi, or 1 Bar, which will result in an output thrust of approximately 300 lbf However, in alternative embodiments, the pressure may vary. For example, if it were pressurized to 3 Bar, resulting in 900 lbf of thrust, that would be suitable for light sport aircraft (LSA) or to provide space tourist rides. In the pressure were increased to 6 Bar, the resultant thrust of approximately 1,800 lbf would be useful to power postal vehicles, light delivery trucks, ferry, transport boats, etc.

A manual control arm 1405 is operatively connected to enable to the toroidal lift force engine to be rotated, i.e., in order to change the direction that thrust is applied. In exemplary FIG. 12, the manual control arm 1405 enables the toroidal lift force engine to be rotated between the two supports. It should be noted that in alternative embodiments of the present invention, differing control mechanisms may be utilized to enable thrust to be directed in any direction. Therefore, the description of a manual control arm should be taken as exemplary only. In alternative embodiments, a motor control unit (not shown) may be mounted on one of the supports 1210. The motor control unit may be utilized to rotate the toroidal lift force engine 1200 to change the direction of which thrust 1235 is exerted. In accordance with an illustrative embodiment, due to the asymmetric force on the toroidal lift force engine blades, thrust is generated in one direction, as illustrated by arrow 1235 in FIG. 12. This direction is opposite of what one experiences with a conventional jet engine as the thrust force is from an asymmetrical pressure distribution upon the working blades and not from expelling various particles.

Illustratively, to change the direction of thrust requires that the toroidal lift force engine be oriented to so that the direction of thrust matches the desired direction. For example, manual control arm 1405, with its fine and course detent selections, may orient the toroidal lift force engine at any orientation in 360 degrees to direct thrust upwards to enable an overweight vehicle to take off. In certain embodiments, the manual control arm 1405 may be limited to adjusting in set degree increments, e.g., 5-degree increments. However, in alternative embodiments, the manual control arm 1405 may not be so limited. In alternative embodiments, thrust may be directed in a first direction to enable an aircraft, or other vehicle, to accelerate in a forward direction. The toroidal lift force engine may then be rotated 180° later to enable deceleration.

Further, illustrative input 1225 and output 1230 hoses may be provided to allow fluid (e.g., hydraulic or coolant fluid) to flow into and out of the toroidal lift force engine. Illustratively, the fluid may be pumped by a pump operated by the lift turbine. The fluid may be used to power a generator, heat exchanger, or passed through a precision adjustable orifice, such as a needle valve (not shown), to exercise speed control of the enclosed lift turbine 1710 (FIG. 17), relative to the flowing working gas in accordance with illustrative embodiments of the present invention.

Exemplary adjustment knob 1250 is illustratively utilized to adjust the angle of the axial flow turbine input stator blades to enable the toroidal lift force engine to operate efficiently at varying speeds. As will be appreciated by those skilled in the art, the manual adjustment knob 1250 may be automated in accordance with alternative embodiments of the present invention.

Figure 13:
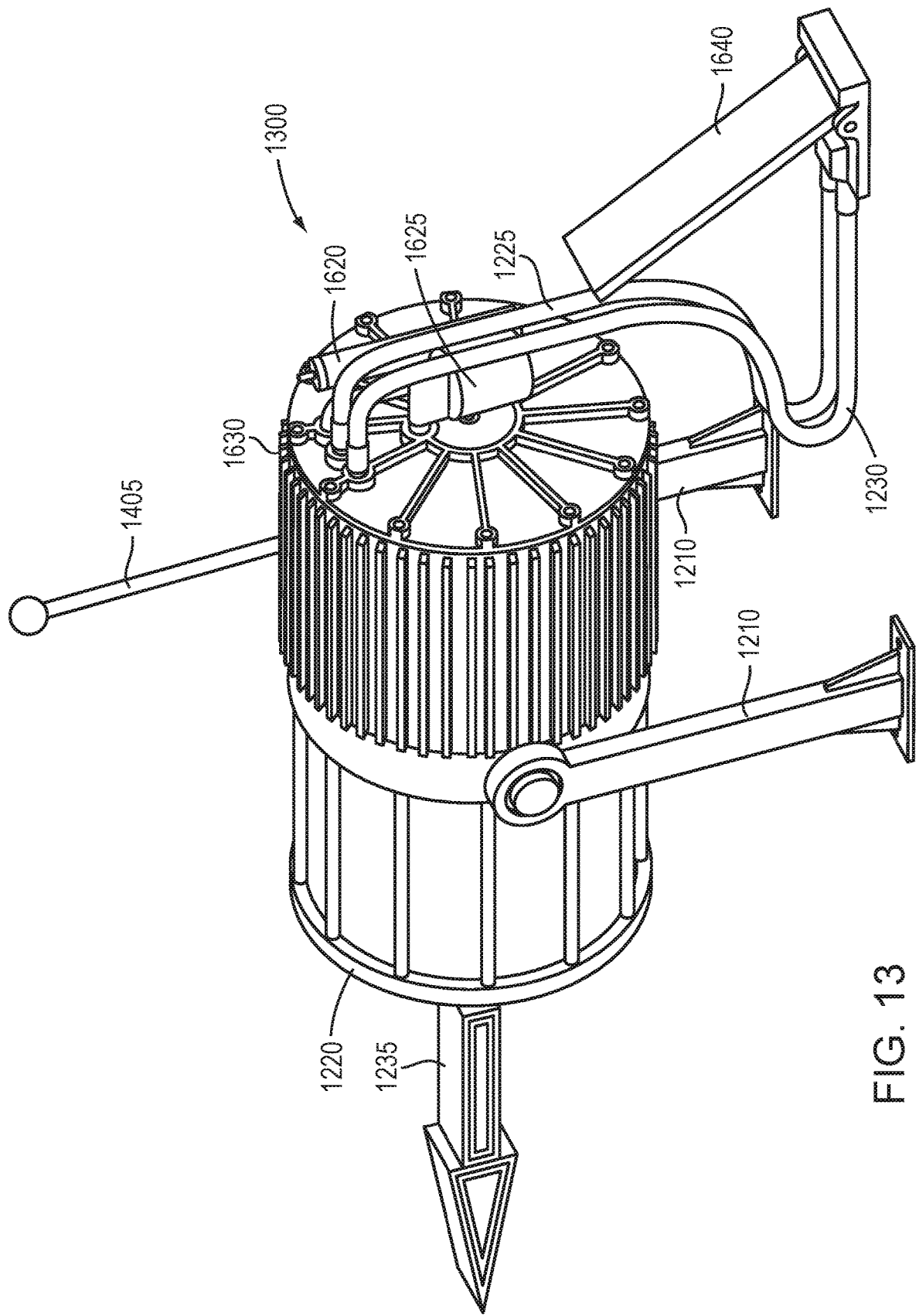
FIG. 13 is a perspective view of an exemplary toroidal lift force engine in accordance with an illustrative embodiment of the present invention.

FIG. 13 is an exemplary view 1300 of a toroidal lift force engine in accordance with an illustrative embodiment of the present invention. Like that described above in relation to FIG. 12, exemplary view 1300 shows a perspective of the toroidal lift force engine. The removable outer container cover 1205, which encloses illustrative sound attenuating material (not shown) is shown as well as supports 1210. Input 1225 and output 1230 hoses for hydraulic fluid are illustrated. Again, in accordance with an illustrative embodiment of the present invention, the toroidal lift force engine 1200 outputs thrust 1235 from the direction of endplate 1220.

Also illustrated is an integral heat exchanger 1630, described further below in reference to FIG. 16. A bleed valve 1620 and filter 1625 are also illustrated for use with the toroidal lift force engine's hydraulic system, as described in more detail below in reference to FIG. 16.

Figure 14:
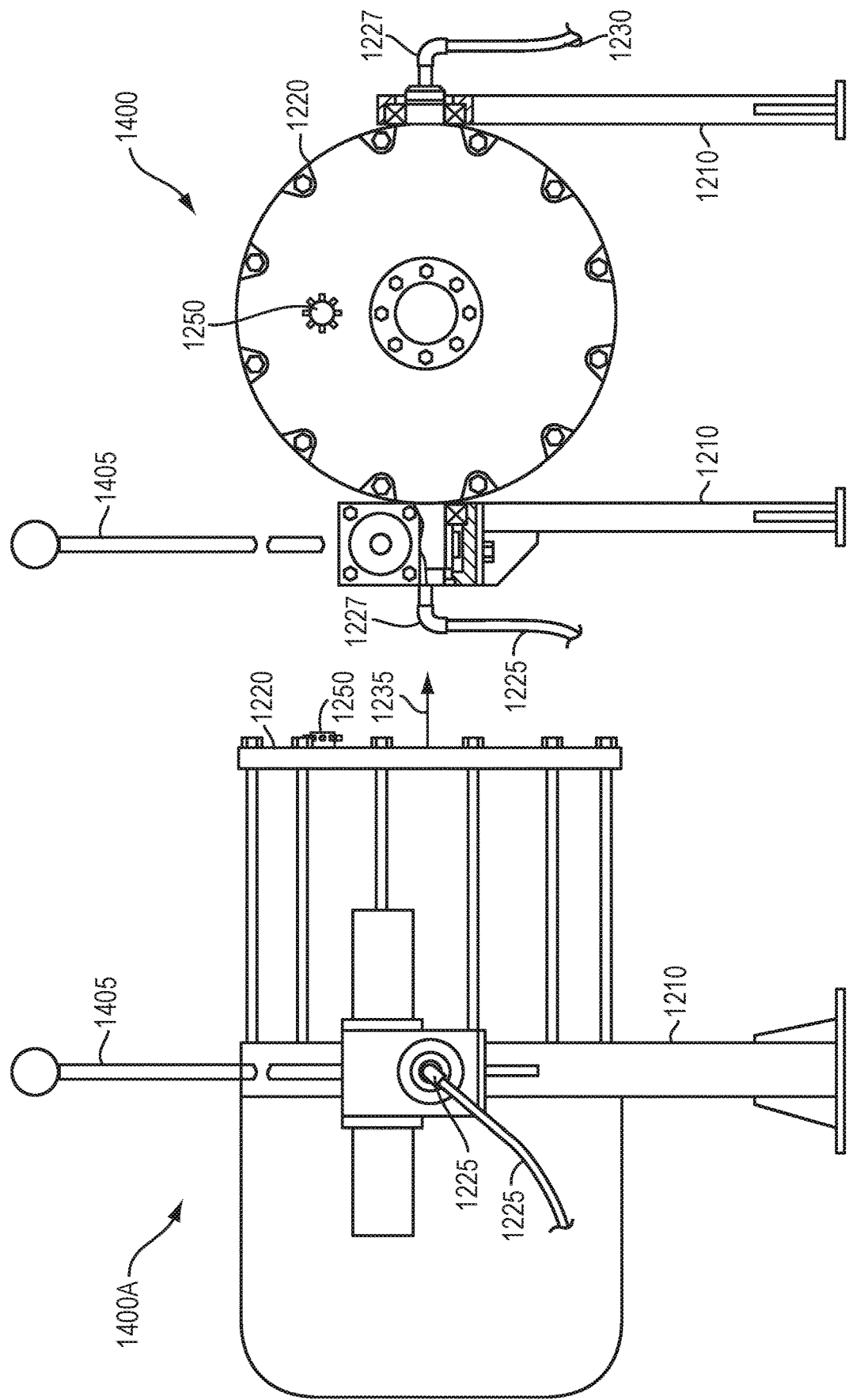
FIG. 14A is a side view of an exemplary toroidal lift force engine with a manual control arm in accordance with an illustrative embodiment of the present invention.
FIG. 14B is a side view of an exemplary toroidal lift force engine with a manual control arm in accordance with an illustrative embodiment of the present invention.

FIG. 14A is a side view 1400A of an exemplary toroidal lift force engine 1200 in accordance with an illustrative embodiment of the present invention. In exemplary view 1400A, a manual control mechanism 1405 is shown to enable the toroidal lift force engine 1200 to be rotated around an axis between supports 1210. A manual control mechanism 1405 may be utilized in certain embodiments, e.g., if a toroidal lift force engine is mounted on a small boat or other craft where manual control is typically utilized to steer by directing thrust or propellers. However, it should be noted that in alternative embodiments the thrust 1235 may be controlled by both an electronic motor control system 1215 and/or a manual control system 1405.

FIG. 14B is a view 1400B of an exemplary toroidal lift force engine 1200 in accordance with an illustrative embodiment of the present invention. The view 1400B illustrates the input 1225 and output 1230 hydraulic hoses that are illustratively run along the supports 1210. However, it should be noted that in alternative embodiments, input 1225 and output 1230 hoses, which are attached to swivel joints (not shown), would normally lead to the turbine start up circuit 2105 (FIG. 21), or exemplary components 1610, 1605, 1606, and 1607 of FIG. 16, may be configured in alternative arrangements and not directly along supports 1210. Further, in alternative embodiments, hoses 1225, 1230 may be integrated into supports 1210 or arranged in differing configurations.

Figure 15:
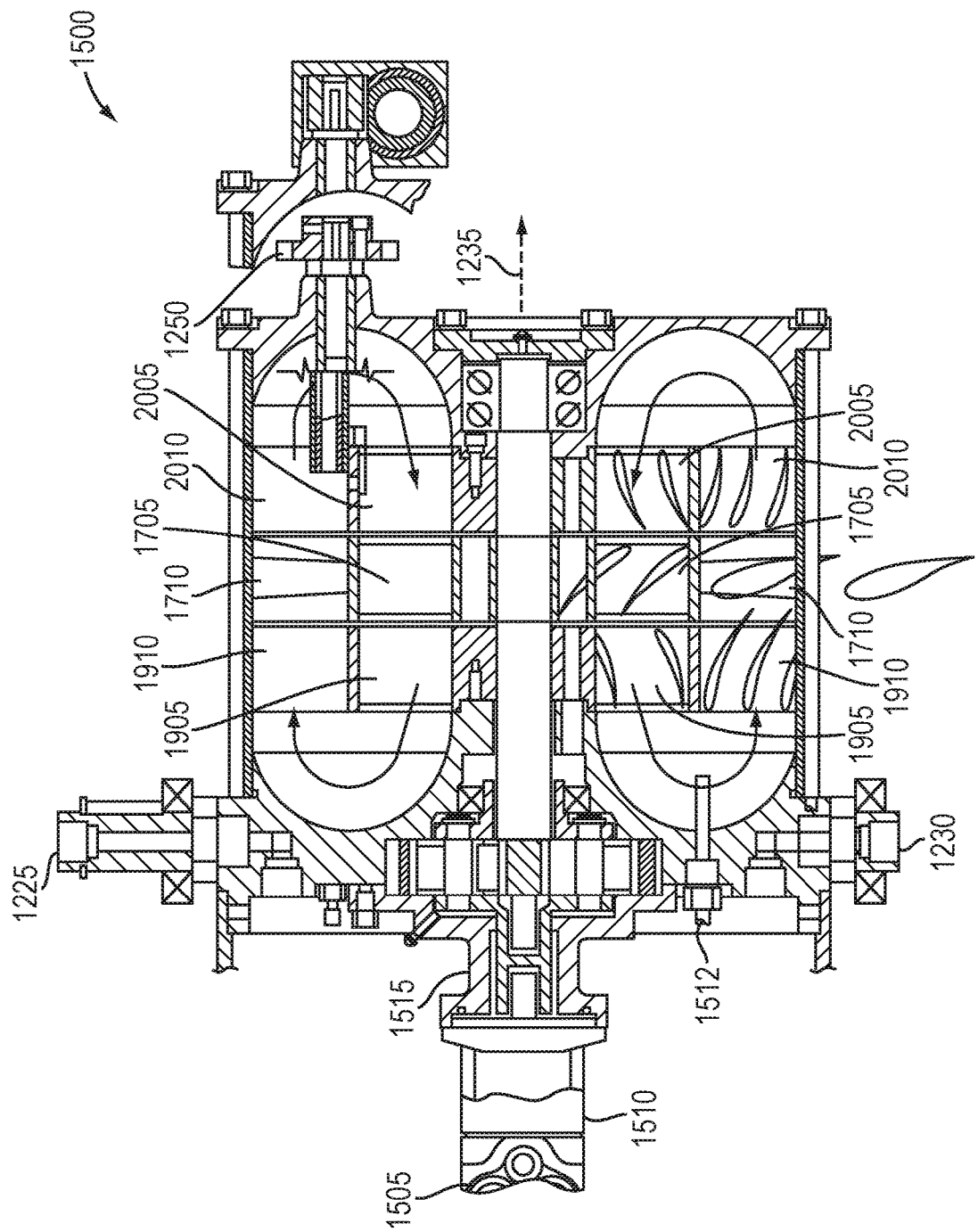
FIG. 15 is an exemplary cross-section of an exemplary toroidal lift force engine in accordance with an illustrative embodiment of the present invention.

FIG. 15 is an exemplary cross-section view 1500 of an exemplary toroidal lift force engine 1200 in accordance with an illustrative embodiment of the present invention. Exemplary toroidal lift force engine 1200 illustratively comprises of two turbine assemblies. Similar to the well-known gas turbine, the first turbine assembly comprises an axial flow compressor turbine assembly that illustratively includes an axial turbine 1705, input stator 2005 and exit stator 1905. The second power turbine assembly includes lift flow turbine 1710, a lift flow input stator 1910, and a lift flow output stator 2010. Lift forces in the exemplary toroidal lift force engine serve a similar purpose as heat in a conventional gas turbine, but without the exorbitant cost of burning petro fuels. The costs of needing to carry fuels, obtaining fuel, and suffering vehicle performance from carrying the fuel are also obviated . . . .

Similar to a power turbine in a gas turbine, the exemplary lift turbine powers the axial flow turbine 1705 to generate a high velocity steady stream of pre-compressed working gas and to recirculate and flow through the toroidal lift force engine. As will be appreciated by those skilled in the art, a plurality of axial flow stages may be utilized, or a centrifugal compressor to achieve the same result. Illustratively, compressed gas is fed into the input stator 1905, described further below in reference to FIG. 19, where the gas is pre-rotated and orientated before entering the lift turbine 1710. After generating lift as it passes through the lift turbine 1710, the gas then exits the lift turbine 1710 and enters the exit stator 2005, described further below in reference to FIG. 20. From our earlier wind machine experiments, it was determined that Lift is composed of two distinct causes: (1) Newton momentum exchange, and (2) asymmetrical pressure distribution on the blades. The exemplary toroidal lift force engine utilizes only the asymmetric portion. In operation, there is asymmetric pressure distribution on the blades of the lift turbine 1710, which allows lift to be generated even though the gas is contained within an exemplary sealed solid container. The external needle valve in the hydraulic control system controls and regulates Alpha, the working fluid's attack angle on the lift turbine blades at all times and at all speeds automatically. This asymmetric pressure generated by the exemplary lift turbine utilizing pre-rotated orientated flow. The purpose of this pre-rotated flow is to minimize the possible variations of Alpha, the fluid's attack angle at all times, thereby preventing stalling and flow interruption surges that are commonly found in variable speed gas turbines and jet engines. Further, as noted above, the lift turbine illustratively flows opposite as a conventional jet engine, that is it rotates into the flow of the gas. In alternative embodiments, the lift turbine exit stator 2010 may be eliminated by combining its function into the axial flow compressor input stator 2005. Further, in alternative embodiments, the axial flow exit stator 1905 may be combined with the lift turbines' input stator 1910.

The illustrative toroidal lift force engine 1500 also comprises a hydraulic pump/motor 1510 that is operated by the turning of, or turned by, the blades of the lift turbine 1710. A planetary gear box assembly 1515 provides the interconnection between the combination lift/axial flow turbine 1710/1705 and the pump 1510, which illustratively includes in its valve plate a high pressure final dynamic system pressure seal for the toroidal lift force engine's pressurized working fluid. An RPM sensor 1505 is utilized to monitor the speed of the pump/motor 1510 and thereby the lift turbine. Illustratively, an anemometer sensor 1512 monitors the velocity of the working gas. Input and output hoses 1225, 1230 are illustratively connected through swivels to the toroidal lift force engine. The hydraulic fluid may be pumped by pump 1510 to power heat exchangers, generators, air conditioners, heat pumps, etc. and/or through a needle valve speed control (not shown). Exemplary devices powered by pump 1510 are described further below in reference to FIGS. 21 and 22.

Illustratively, once the toroidal lift force engine has been started, it requires no fuel and/or further power input and expels no particles of any kind to generate thrust. As it is not a heat engine, the various well-known laws of thermodynamics do not apply to its operation. Once started, it will continue to operate as the lift turbine's lift to drag ratios (L/D) exceeds 1 and is closer to approximately 150:1.

Figure 16:
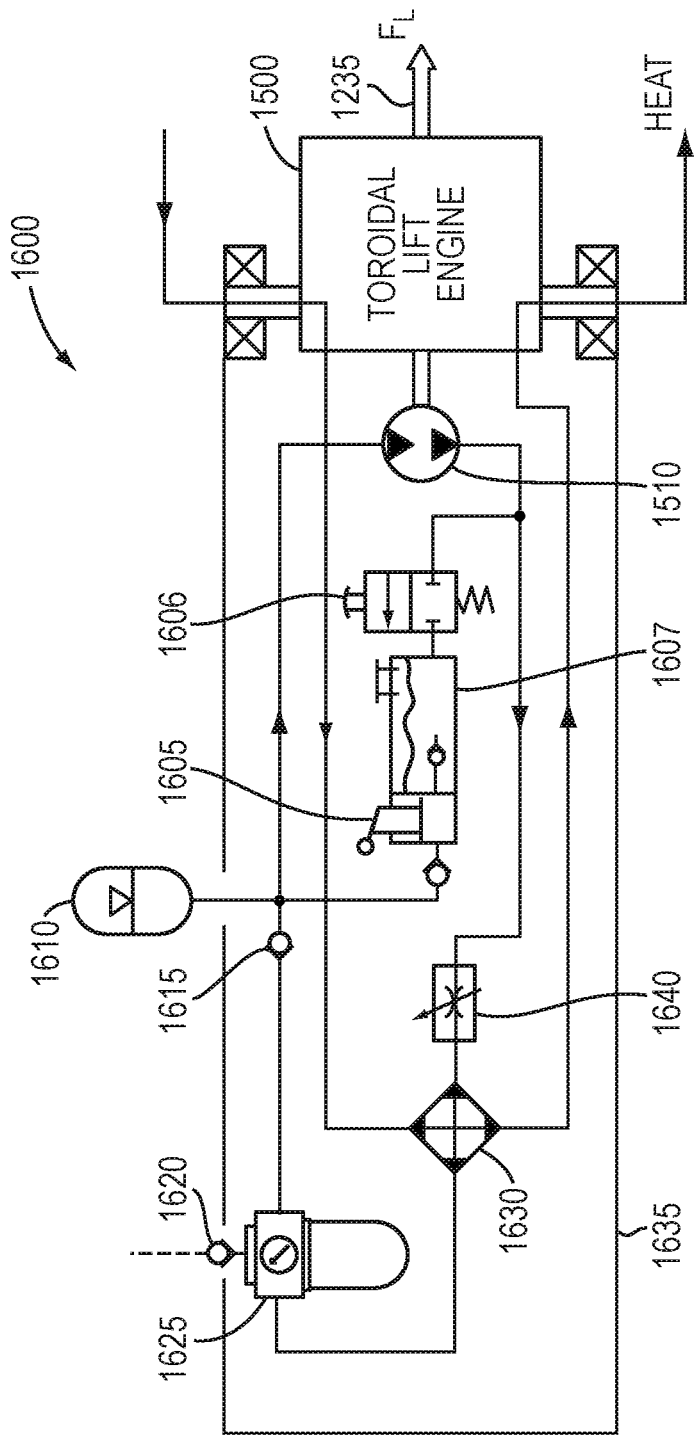
FIG. 16 is a schematic diagram of a power assembly in accordance with an illustrative embodiment of the present invention.

FIG. 16 is a schematic diagram of an exemplary power circuit 1600 in accordance with an illustrative embodiment of the present invention. The exemplary power circuit 1600 states in exemplary control system and hydraulic system for use with a toroidal lift force engine in accordance with an illustrative embodiment of the present invention. Illustratively, the toroidal lift force engine 1500 is operatively interconnected with a pump/motor 1510 that is driven by the operation of the toroidal lift force engine 1500. An exemplary manual starter assembly that illustratively comprises of a manual hydraulic pump 1605 and tank assembly 1607 that is illustratively connected to push button operated on-off valve 1606 is utilized when initializing toroidal lift force engine 1500 by, for example, beginning rotation of the turbines contained therein. The manual pump 1605 is used to pump excess hydraulic fluid into the pre pressurized accumulator 1610. To start the exemplary toroidal lift force engine 1500, the manual valve push button 1605 is depressed for a momentary pulse of hydraulic fluid to flow through the pump/motor, 1510 causing the combined lift and flow turbines 1710, 1705 to begin rotating at high speed. This accelerates the working gas. After flowing through the pump/motor it returns to the open tank on manual pump 1607 through valve. Exemplary needle valve 1640, acting as an adjustable precision orifice, is utilized to control the rate of flow of the hydraulic fluid through the system 1500. Illustrative liquid to liquid heat exchanger 1630 is utilized or may be utilized to extract heat from the hydraulic fluid generated largely by flowing through the needle valve 1640. Illustratively, the thrust or power of the toroidal lift force engine may be controlled by use of the needle valve 1640. To reduce thrust, the needle valve is opened, which allows the lift turbine to slightly speed up until the working fluid back winds it. To increase thrust, the needle valve is progressively closed, which slows down the lift turbine speed relative to the gas velocity. This increased the angle of attack on the lift turbine blades, thereby increasing the power/thrust developed until such action stalls out the lift turbine. In the manner, the power/thrust can be varied in an almost instantaneous fashion.

In an illustrative embodiment, needle valve 1640 may be operatively interconnected with an accelerator pedal, or other device, to enable an operator of a vehicle powered by a toroidal lift force engine to vary the amount of thrust generated.

A pre-charged gas accumulator 1610 is employed to lightly pressurize the closed loop hydraulic system, providing volume for thermal expansion and to provide make up fluid for loses. It is replenished via the hand pump 1605 and tank 1607. Illustrative hydraulic filter 1625 is utilized to keep the hydraulic fluid clear of contaminants. A bleed valve 1620 is utilized to expel entrapped gases from the closed loop hydraulic system.

In operation toroidal lift force engine is initialized utilizing the starter assembly 1605 by causing the fluid to flow through the toroidal lift force engine turbine blades to begin spinning. Once in operation, the turbine blades operate the illustrative motor/pump 1510 which moves the fluid through the system, excess heat from the heat exchanger 1630 may be expelled out of the system has excess heat which may be utilized to for various purposes. Exemplary utilization of the heat may be to heat a home or vehicle, generate hot water, or utilized in a process system and/or to power other systems.

It should be noted that the illustrative power circuit 1600 described herein is an exemplary system whose main purpose is to control and coordinate the rotational speed of the lift turbine 1710 to the speed/velocity of the working gas, using the precision orifice/needle valve 1640, which also generates heat as a byproduct when it passes through the needle valve. However, it is expressly contemplated that in alternative embodiments, differing arrangements may be utilized depending on the desired use of the toroidal lift force engine, such as the more elaborate control circuit in FIG. 21, used to supply heat and/or grid quality power to a house or other building. The exemplary control circuit 2100, in addition to the needle valve control, notably has a priority valve 2140, whose purpose is to send a precise constant flow of hydraulic fluid to motor 2170 that drives synchronous generator 2171 at a near constant RPM, regardless of load, to generate the required 60 or 50 Hz local grid frequency. Therefore, the description contained herein should be taken as exemplary only.

Figure 17B:
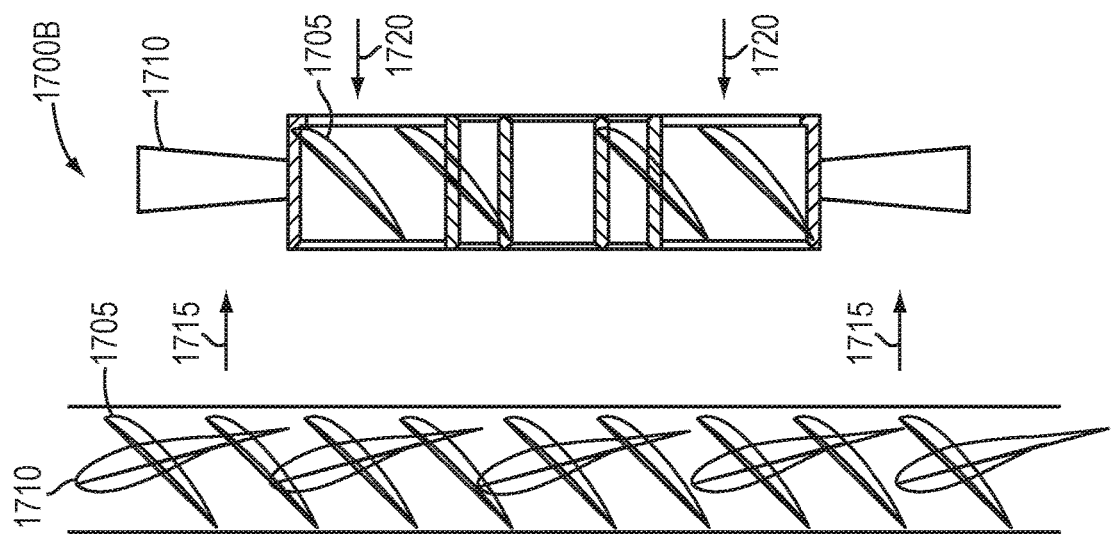
FIG. 17B is an exemplary cross-sectional view of exemplary blades for an exemplary lift and axial flow turbine in accordance with an illustrative embodiment of the present invention.
Figure 17A:
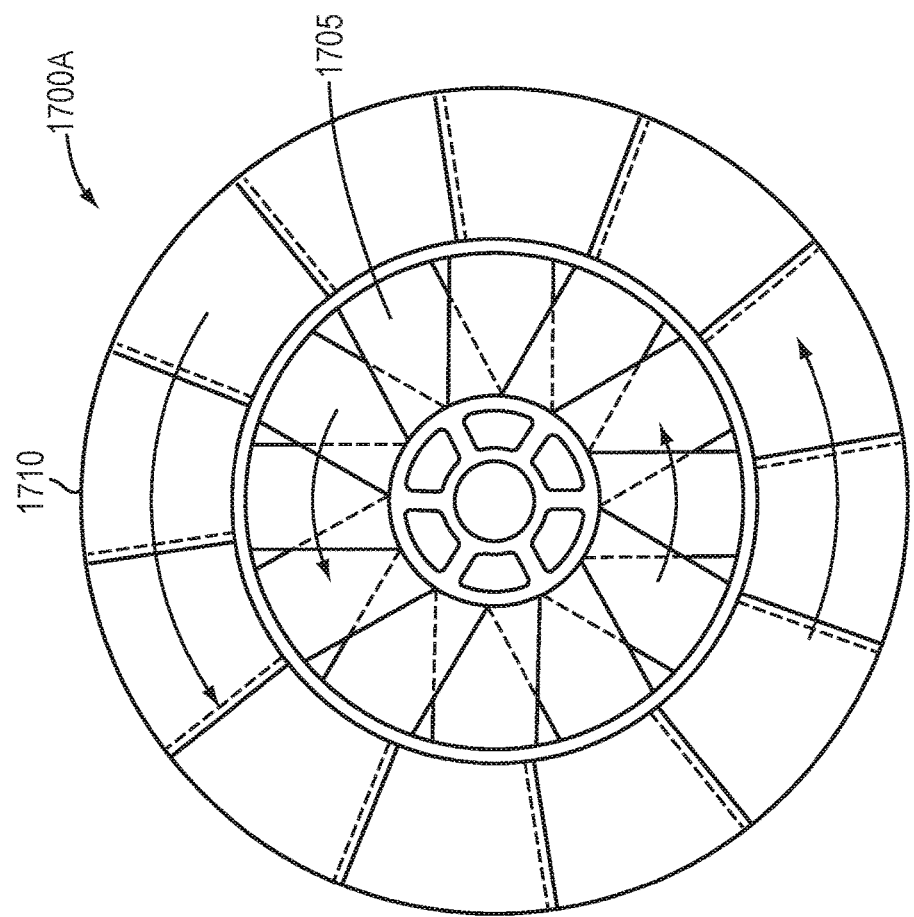
FIG. 17A is a forward view of exemplary blades for an exemplary lift and axial flow turbine in accordance with an illustrative embodiment of the present invention.

FIG. 17A is a straight on view 1700A of exemplary blades of a lift turbine 1710 and axial flow turbine 1705 in accordance with an illustrative embodiment of the present invention.

FIG. 17B is a cross-sectional view 1700B of the blades of an exemplary toroidal lift force engine 1200 in accordance with an illustrative embodiment of the present invention. Similar to FIG. 17A, lift turbine blades 1710 are shown as well as the axial flow blades 1705. Flow 1715 and flow 1720 are shown to indicate the direction of the fluid flow within the assembly. The mean velocity of flow 1720 is approximately twice the mean velocity of flow 1715 because of the change in housing geometry.

Figure 18:
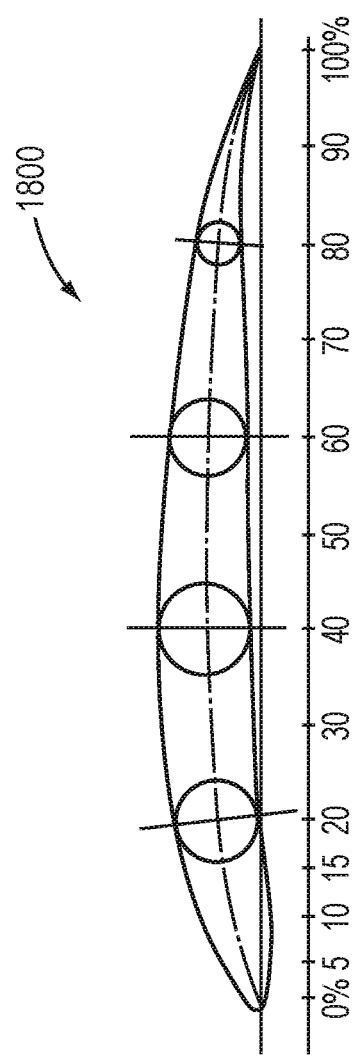
FIG. 18 is a cross-sectional diagram of an exemplary blade for use with the input/exit stators as well as the axial flow turbine of a toroidal lift force engine in accordance with an illustrative embodiment of the present invention.

FIG. 18 is a cross-sectional view 1800 of an exemplary blade of a toroidal lift force engine in accordance with an illustrative embodiment of the present invention. Exemplary blade 1800 shows an illustrative cross-section for all blades utilized within the toroidal lift force engine except for the lift turbine itself.

Figure 19B:
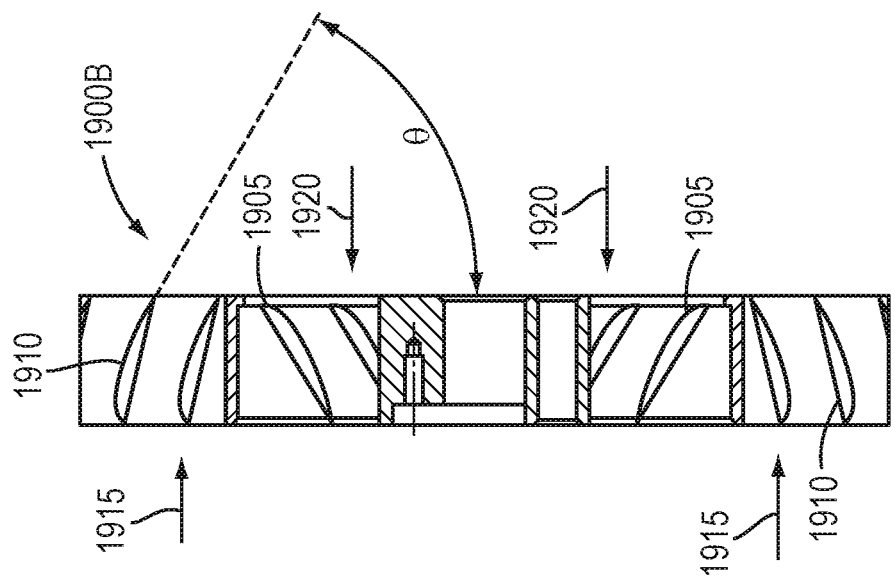
FIG. 19B is a cross-sectional view of blades for an input stator, showing 0° angle, in accordance with an illustrative embodiment of the present invention.
Figure 19A:
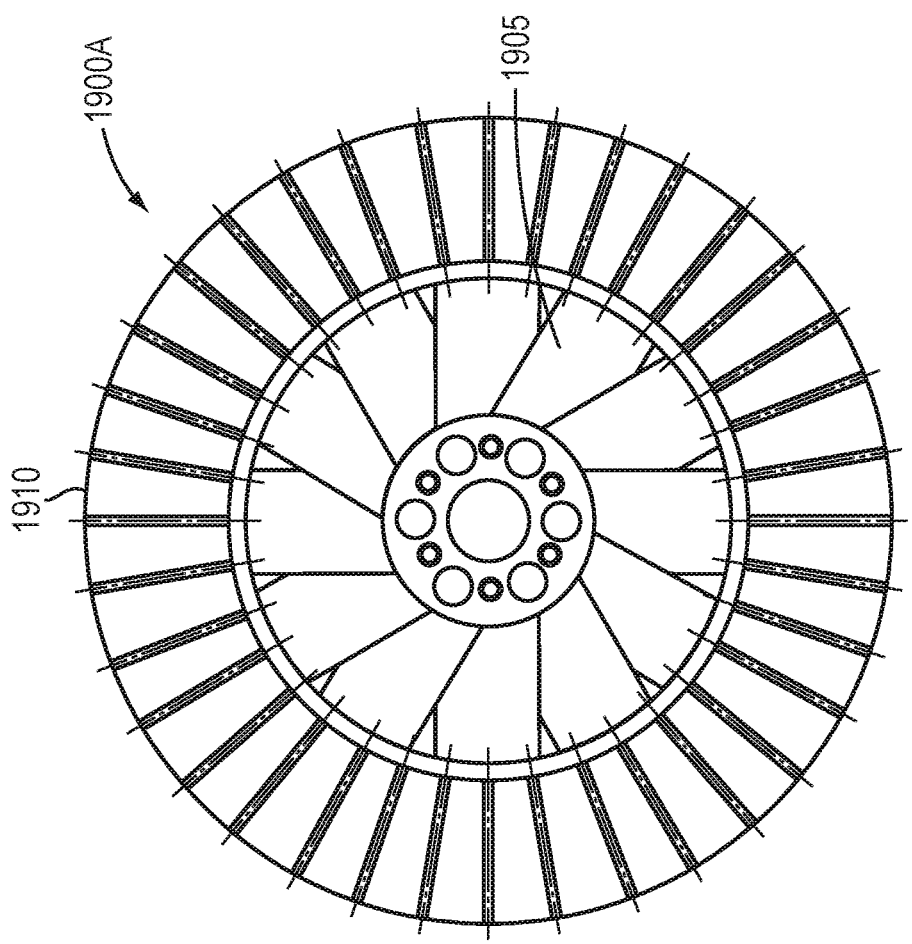
FIG. 19A is a forward view of blades for an input stator to the lift turbine and exit stator to the axial compressor turbine in accordance with an illustrative embodiment of the present invention.

FIG. 19A is a straight on view 1900A of exemplary blades of turbine lift intake stator 1910 and in accordance with an illustrative embodiment of the present invention. Exemplary blade 1910 with flow exiting at angle θ, shown below in reference to FIG. 19B, is utilized by the stator to pre-rotated the flow. Specifically, the flow is preloaded rotated to maximize a particular angle of attack as the fluid enters the lift turbine. Blades 1905 are utilized to straighten out the flow to minimize flow loses as it comes out of the axial flow turbine 1705 prior to entering the lift turbine input stator 1910 again. Illustratively, blades of the input stator 1900 are stationary utilized to passively rotate and/or straighten out the flow as the fluid of the toroidal engine passes through.

FIG. 19B is a side view 1900B of exemplary blades of an input stator 1900 showing angle θ in accordance with an illustrative embodiment of the present invention. Flows 1915, 1920 are shown to indicate the direction of flow of the fluid in accordance with an illustrative embodiment of the present invention.

FIG. 20A is a side view 2000A of a cross-sectional view of exemplary blades of an exit stator 2010 in accordance with an illustrative body of the present invention. Exemplary exit stator 2000 includes a set of blades 2010 are utilized to straighten the flow 2015 of the fluid as it exits the lift turbine. Exemplary blades 2010 are not adjustable and do not rotate. Exemplary blades 2005 are optionally adjustable and are utilized to adjust the angle of attack of the fluid as it enters the axial flow turbine, 1705.

FIG. 20B is a straight on view 2000B of exemplary blades in accordance with an illustrative embodiment of the present invention. As described above in relation to FIG. 20A, exemplary blades 2010 remain stationary and are fixed. Blades 2010 straighten the flow 2015 as it exits the lift turbine to minimize flow loses. Blades 2005 remain stationary but may be optionally adjusted to modify the angle of attack for the flow 2020 as it passes through the axial flow turbine blades, 1705.

Figure 20C:
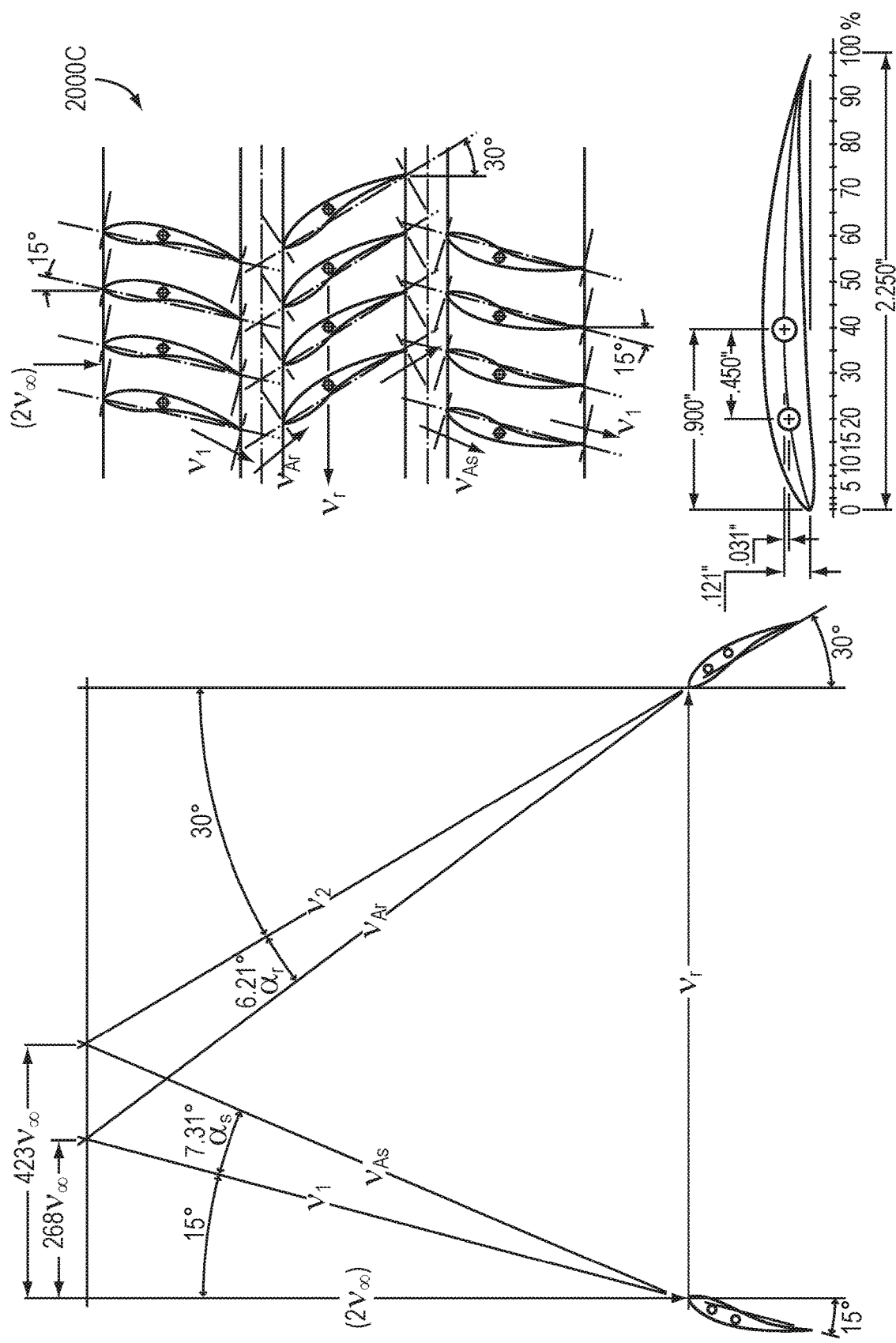
FIG. 20C is a cross-sectional view of the blade velocity diagram of a toroidal lift force engine's axial flow turbine with its input and output stators in accordance with an illustrative embodiment of the present invention.

FIG. 20C is a cross-sectional view 2000C of the blade velocity diagram of a toroidal lift force engine's axial flow turbine with its input and output stators in accordance with an illustrative embodiment of the present invention.

Figure 20D:
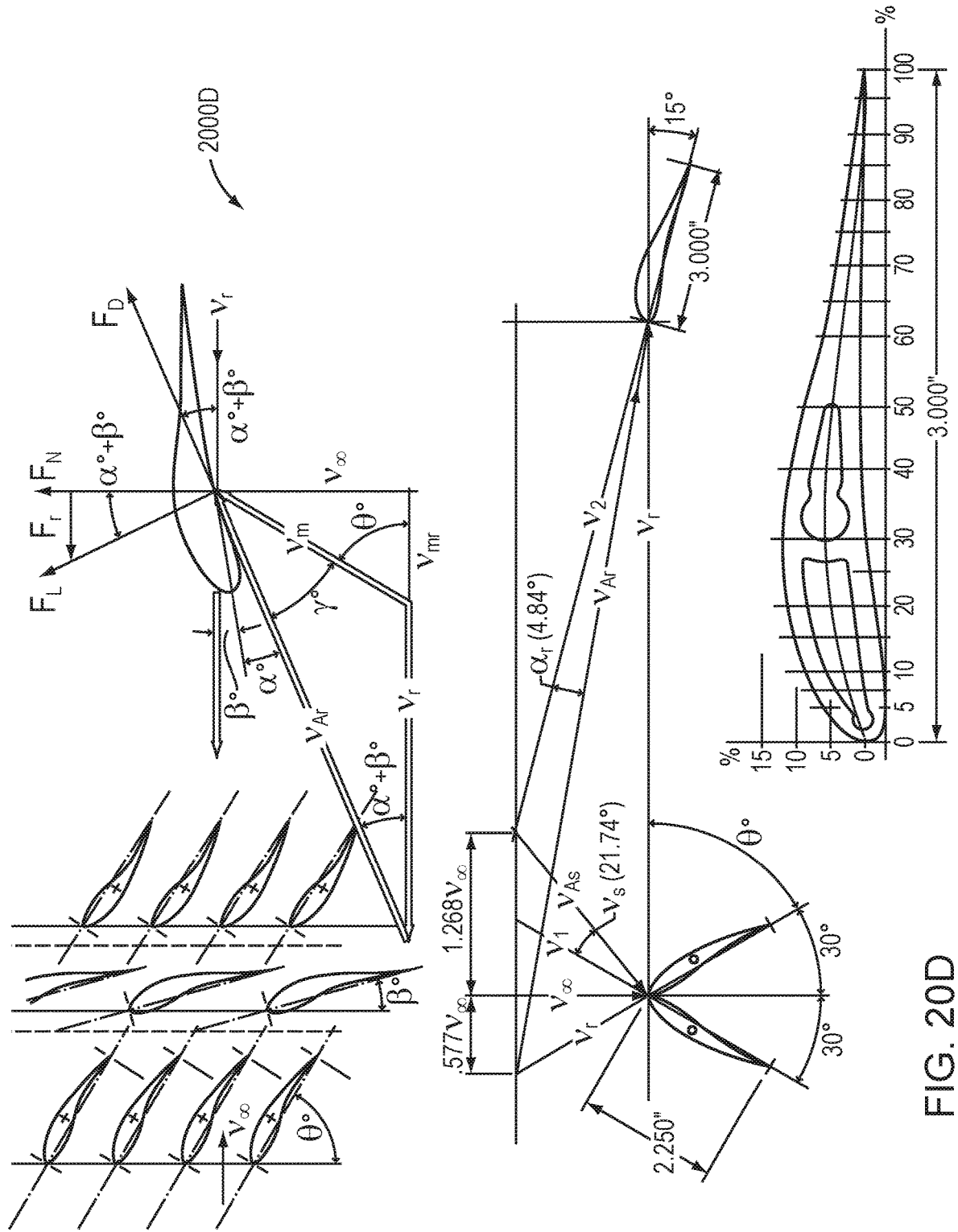
FIG. 20D is a cross-sectional view of the blade velocity diagram of the toroidal lift force engine's lift force turbine with its input and output stators showing its rotation into the flow of the working fluid, differing from conventional gas turbines and steam engines in accordance with an illustrative embodiment of the present invention.

FIG. 20D is a cross-sectional view 2000D of the blade velocity diagram of the toroidal lift force engine's lift force turbine with its input and output stators showing its rotation into the flow of the working fluid, differing from conventional gas turbines and steam engines in accordance with an illustrative embodiment of the present invention.

Figure 21:
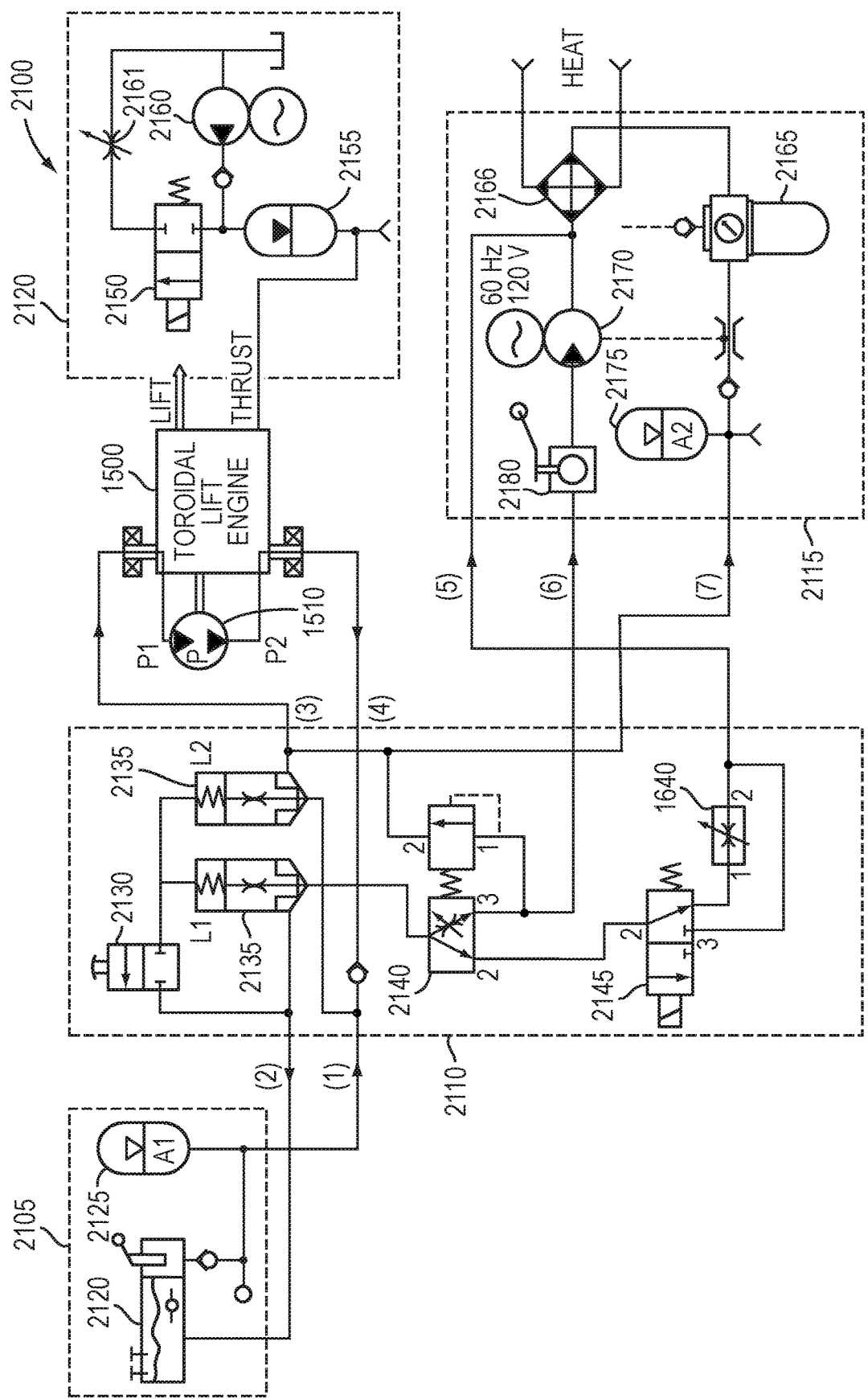
FIG. 21 is a hydraulic schematic of the control and energy harvesting diagram of a toroidal lift force engine in accordance with an illustrative embodiment of the present invention.

FIG. 21 is an exemplary schematic diagram 2100 in accordance with an illustrative embodiment of the present invention. FIG. 21 illustrates the toroidal lift engine 1500 operatively interconnected with a manifold assembly 2110, a fluid turbine starter/recharge circuit 2105, a hand pump/tank power starter circuit 2120, and an energy harvest assembly 2115. The toroidal lift force engine 1200 is also operative interconnected with exemplary motor pump 1510 that either drives (for startup), or is driven (when delivering power) by the lift turbine.

The fluid recharge circuit 2105 is utilized as the starter circuit for the toroidal lift force engine. Exemplary circuit 2015 includes a combined hand pump, tank, and valves 2120 that is used to pump up accumulator 2125. In alternative embodiments, the hand pump 2120 may be replaced with an electric pump; however, use of the hand pump enables operations to be off grid without requiring access to outside sources of electricity.

The manifold assembly 2110 illustratively comprises of the starter and operating valves. Exemplary logic valves 2135 are needed for the starter circuit and are noted for their small size and high flow rate capacity. Logic valves 2135 are operated via the hand palm button valve 2130. Priority valve 2140 is utilized to supply a constant oil flow to the motor for powering the motor 2170 of the electric generator 2171. Exemplary needle valve 1640 is utilized to control the speed of the lift turbine; actuating solenoid valve 2145 bypasses it for emergency power cut off.

Exemplary power boost circuit 2120, which is optional, enables automatic or manual boosting, via pump/motor 2160, or reducing, via needle valve 2161 and/or solenoid valve 2150, the fluid's working pressure. This will adjust the density of the fluid during operation of the toroidal lift force engine, boosting or reducing its power by an order of magnitude if desired.

The energy harvest assembly 2115 includes the system shut off valve 2180, an exemplary grid frequency hydraulic motor generator 2170, a heat exchanger 2166, the system filter 2165, and the make up accumulator 2175.

It should be noted that the circuits described and shown in FIGS. 16 and 21 are one illustrative embodiment. Other circuits may be utilized to generate power, heat, etc. and/or to start and control the toroidal lift force engine. Therefore, the description and illustration of FIGS. 16 and 21 should be taken as exemplary only.

Figure 22:
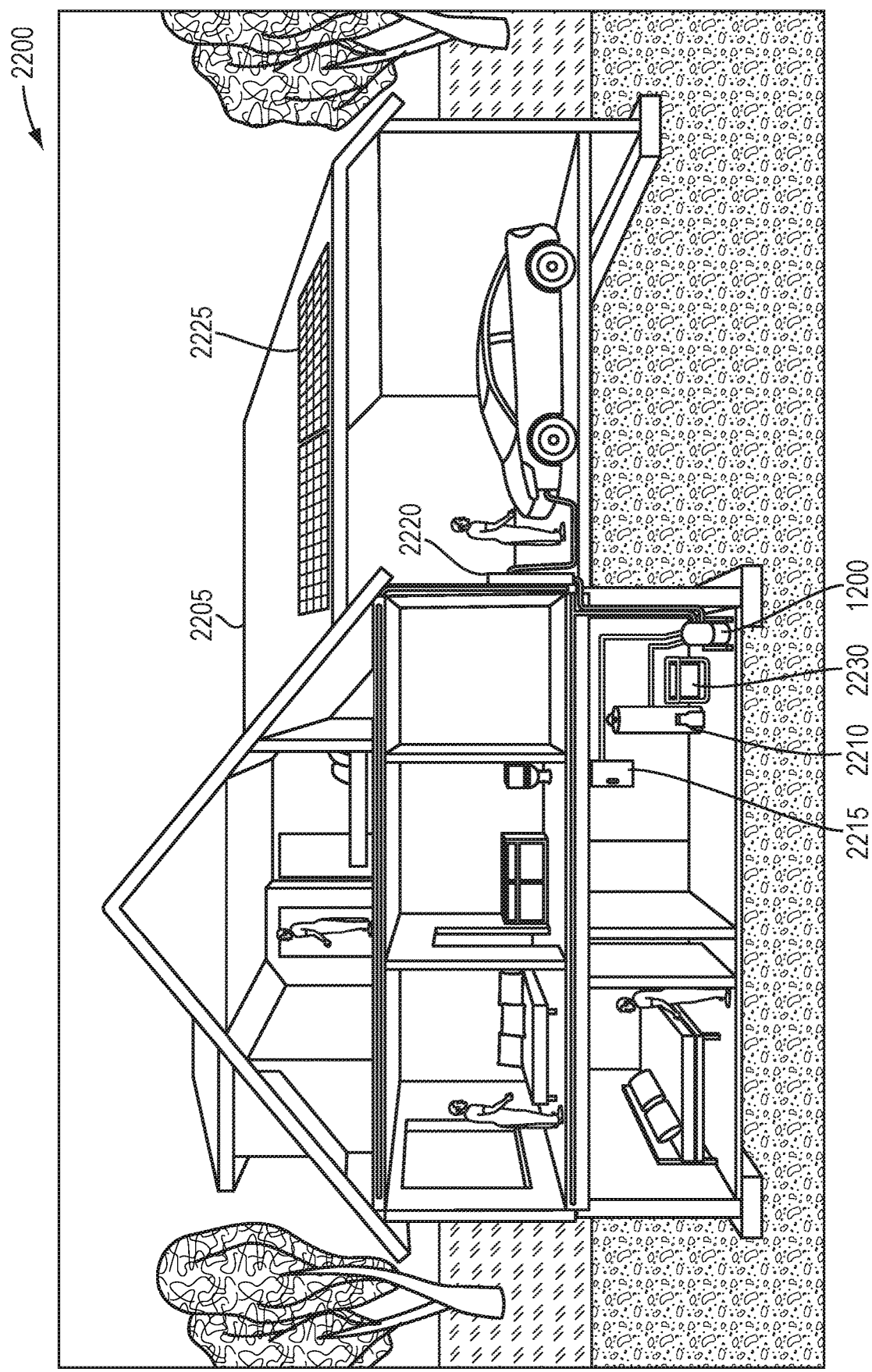
FIG. 22 is an exemplary environment illustrating uses of a toroidal lift force engine in a home (or other building) in accordance with an illustrative embodiment of the present invention.

FIG. 22 is an exemplary diagram of a building 2205, e.g., a house, that is being powered by a toroidal lift force engine 1200 in accordance with an illustrative embodiment of the present invention. In operation, the toroidal lift force engine 1200 generate excess heat that is utilized to heat a hot water tank 2210. Further, the excess flow may be utilized to power a generator 2230 that generates electricity to power the house, and/or charging points 2220 for electric vehicles. In accordance with an illustrative body of the present invention, a single toroidal lift force engine may be sized so that it is mounted in a house 2205 to provide sufficient power for the house as well as to provide heat, hot water and/or air conditioning.

Figure 23:
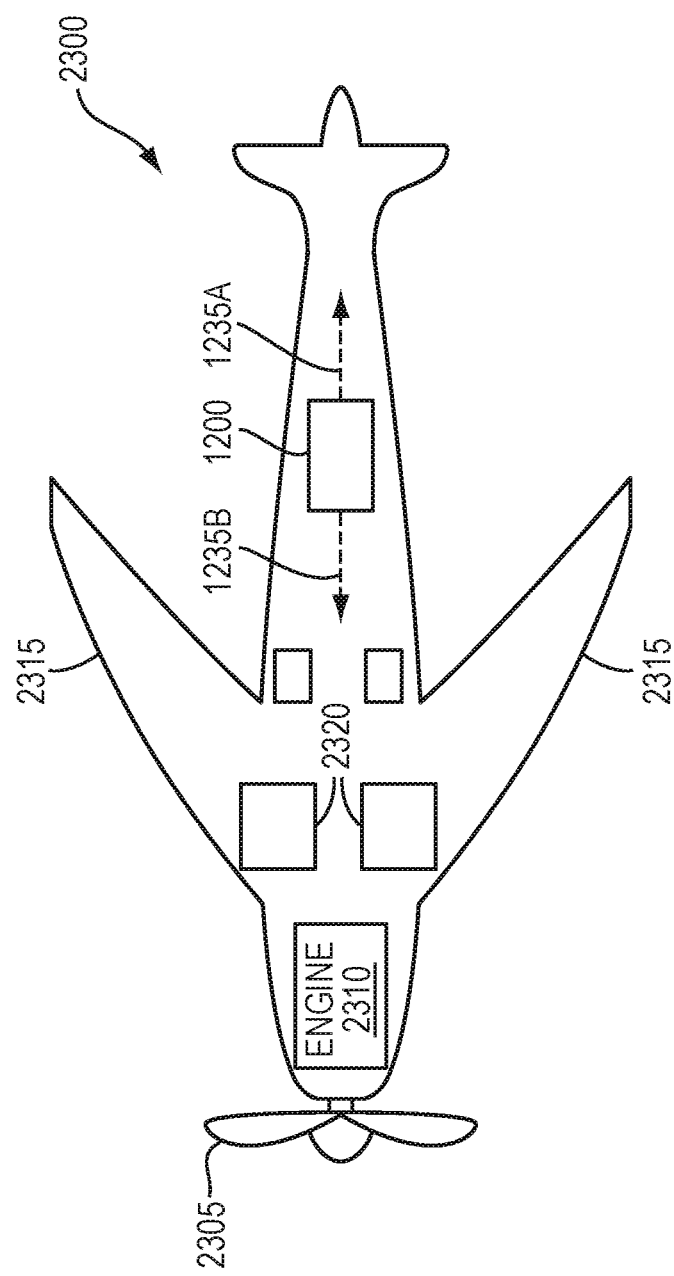
FIG. 23 is a view of a toroidal lift force engine in an aircraft or other moving vehicle in accordance with an illustrative embodiment of the present invention.

FIG. 23 is a diagram of an exemplary aircraft 2300 that utilizes a toroidal lift force engine in accordance with an illustrative embodiment of the present invention. Aircraft 2300 is illustratively shown as utilizing engine 2310 that powers propellers 2305. However, it should be noted that in accordance with alternative embodiments of the present invention, aircraft 2300 may utilize a variety of differing 2310 configurations, including, for example a multi-engine configuration. As such, the description of aircraft 2300 being a single engine propeller plane should be taken as exemplary only. Aircraft 2300 has a set of conventional wings 2315 and a plurality of seats 2320. The toroidal lift force engine 1200 is illustratively mounted behind seats 2320 and is configured so that it may be oriented so that thrust 1235 may be generated upwards, downwards, forwards or aft wards. Illustratively, the toroidal lift force engine 1200 may be mounted so that it is rotatable along an axis perpendicular to the fore-aft axis of the aircraft.

In an illustrative embodiment, thrust 1235 may be generated afterwards to enable aircraft 2360 to takeoff from a runway that is shorter than is normally required for that aircraft. Further, once airborne, the engine 2310 may be either throttled and/or shut off completely provided that the thrust 1235 provided by the toroidal lift force engine 1200 is sufficient to maintain steady flight. In such embodiments, significant aircraft fuel may be saved by obviating the need for engine 2310 to continue to operate during flight cruising operations.

Toroidal lift force engine may be oriented so that thrust 1235 is directed forwards to enable aircraft 2300 to land on a runway that is shorter than what would be required for the aircraft 2300, i.e., to provide thrust in a reverse direction. This may enable an aircraft 2300 to land on emergency runways and/or irregular or nonconventional landing zones. This may prove useful in, for example medical evacuations, or other emergency situations. Illustratively, the throttles of the aircraft may be tied to the needle valve 1640 to enable variations on the amount of thrust generated.

Figure 24:
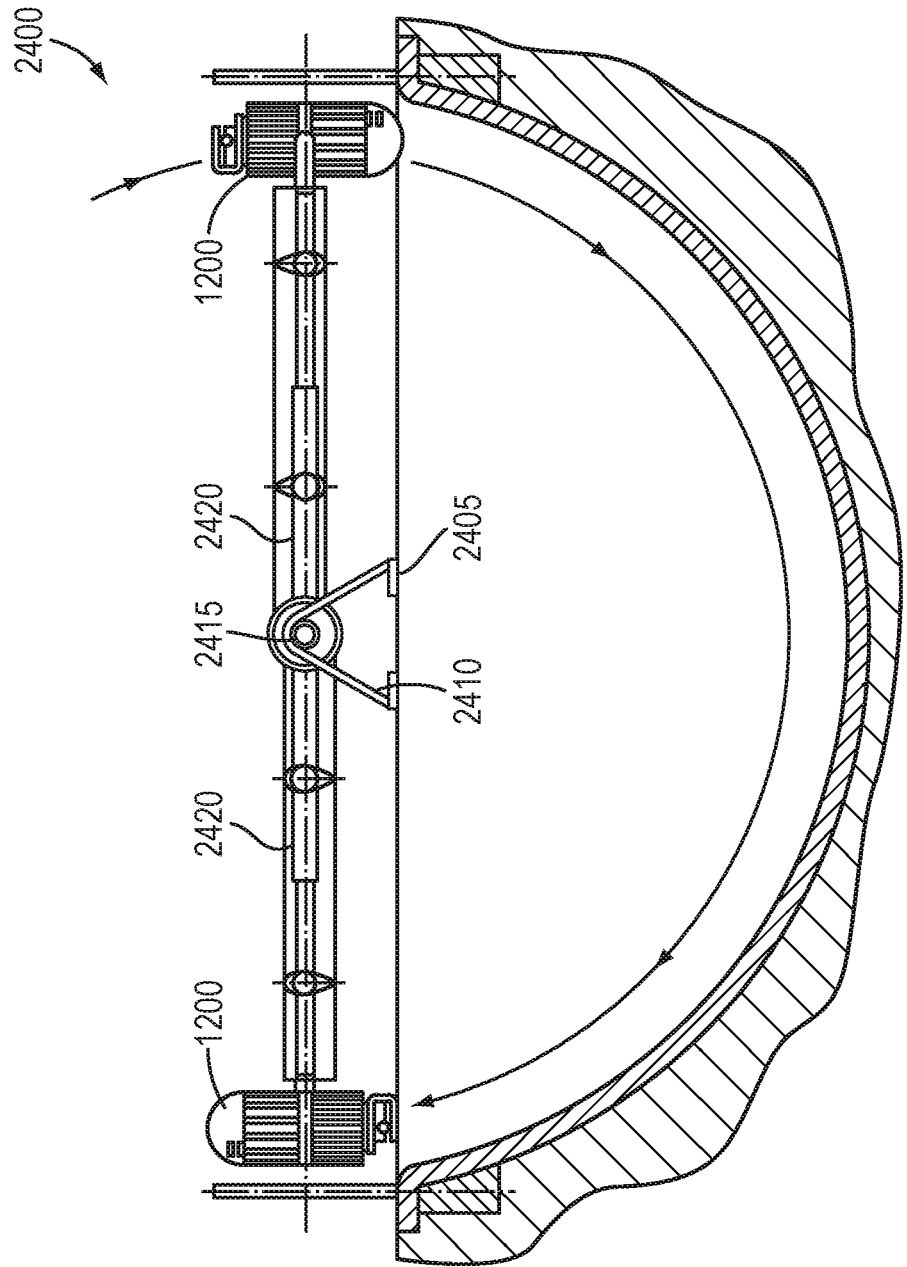
FIG. 24 is a perspective view of an exemplary power generating apparatus that utilizes a plurality of toroidal lift force engines in accordance with an illustrative embodiment of the present invention.

FIG. 24 is a perspective view of an exemplary power generating apparatus 2400 that utilizes a plurality of toroidal lift force engines 1200 in accordance with an illustrative embodiment of the present invention. Illustratively, the power generating apparatus 2400 may be arranged in a windmill like configuration. Each of the toroidal lift force engines 1200 may be mounted at the end of a support arm 2420, which are centrally mounted to a central support 2415. The rotating support arm powers a larger hydraulic pump 2610 to drive offsite generators 2171, air conditioners, heat pumps, etc. The assembly may be mounted on a support post 2410 that is anchored to a base 2405.

By mounting a plurality (e.g., 8) of toroidal lift force engines 1200 in such an arrangement and using them to turn a generator (see FIG. 25), it is calculated that power on the order of approximately 10,000 horsepower, or any other desired amount, may be generated to power large buildings, ships, submarines, central power stations, or wherever large gas/steam turbines, diesel engines and/or nuclear power reactors are utilized. The use of a system in accordance with illustrative embodiments of the present invention will result in fuel savings costs as well as avoiding the not insignificant costs of intrastate electric transmission, gas/oil pipelines and rail/truck facilities required to transport said fuels to where they are consumed or the power used.

Figure 25:
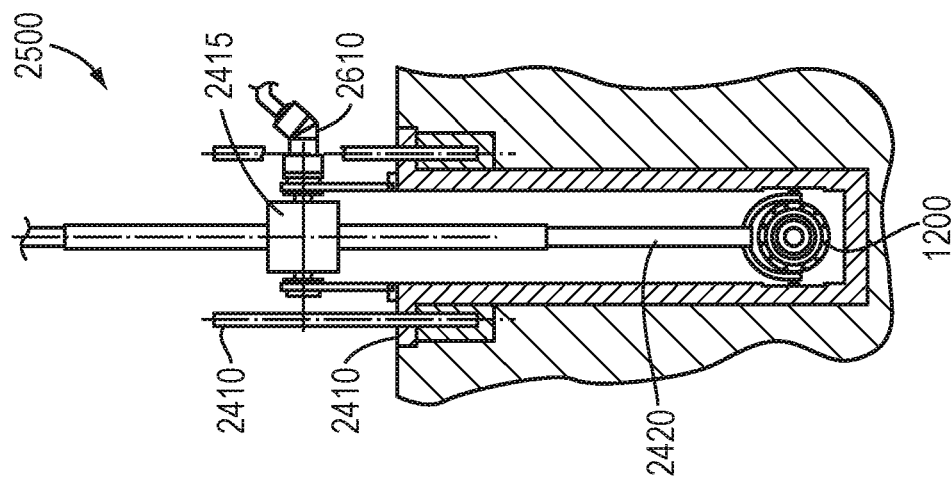
FIG. 25 is a top view of an exemplary power generating apparatus that utilizes a plurality of toroidal lift force engines in accordance with an illustrative embodiment of the present invention.

FIG. 25 is a top view of an exemplary power generating apparatus that utilizes a plurality of toroidal lift force engines in accordance with an illustrative embodiment of the present invention. The nacelle includes an exemplary generator 2660 that is rotated by operation of the toroidal lift force engines 1200 acting on supports 2420 to induce a rotation.

Figure 26:
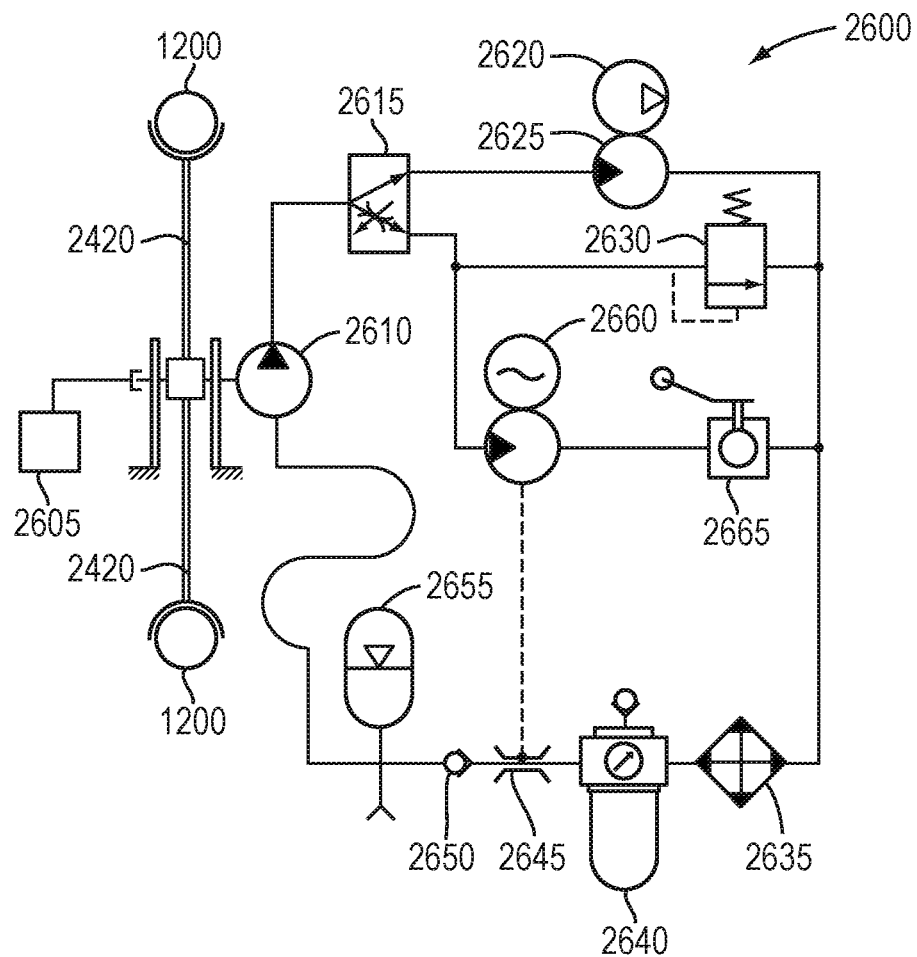
FIG. 26 is a schematic diagram of an exemplary power generating apparatus that utilizes a plurality of toroidal lift force engines in accordance with an illustrative embodiment of the present invention.

FIG. 26 is a schematic diagram of an exemplary power generating apparatus 2600 that utilizes a plurality of toroidal lift force engines 1200 in accordance with an illustrative embodiment of the present invention. The apparatus 2600 includes a plurality of toroidal lift force engines 1200 mounted on support arms 2420, as described above in relation to FIGS. 24-25. Exemplary control until 2605 includes a needle valve control system 1640, similar to that described above in relation to FIG. 16. The remainder of the circuit is a power output circuit designed to provide power, heat, etc. based on operation of the toroidal lift force engines.

The rotation of the toroidal lift force engines 1200 is used to drive pump 2610 to pump fluid through priority valve 2615 to drive exemplary local grid frequency electric generator 2660 as well as exemplary heat pump 2625 for general purpose heating and air conditioning systems 2620. The fluid may flow from valve 2615 ultimately through heat exchanger 2635, filter 2640, check valve 2650 past an accumulator 2655 and back to the input to the pump 2610 completing the closed circuit.

By using a system similar to apparatus 2600, a plurality of toroidal lift force engines may be used to provide substantial power, heating, cooling, etc.

The above description has been written in terms of various exemplary embodiments. Therefore, it is intended that all matter contained in the above description or shown in the accompanying drawings should be interpreted as illustrative and not in a limiting sense. Specifically, it should be noted that each various sizes, degrees of overlap, materials, number of blades, etc. should be viewed as exemplary and not limiting the scope of the present invention. As will be appreciated by those skilled in the art, the principles of the present invention may be utilized with a variety of materials, sizes, and/or objectives.

It should be noted that while various descriptions and arrangement of components have been described herein providing electricity, heat, hot water, and/or air conditioning, the principles of the present invention may be utilized in a wide variety of systems. As such, the description of particular arrangements of components should be taken as exemplary only. It should be expressly noted that in alternative embodiments, a halt system may be configured to provide only hot water, electricity, or heat, or any combination thereof. As will be appreciated by those skilled in the art, the principles of the present invention for the description contained herein may have unnecessary components removed in order to meet the desired objectives of a particular installation.

What is claimed is:

1. An apparatus comprising:
a lift turbine assembly operatively interconnected with an axial flow turbine assembly, the lift turbine assembly and the axial flow turbine assembly being housed within a container filled with a gas;
the lift turbine assembly including:
(a) an input stator having a first set of blades, the first set of blades causing a counter rotation flow in the gas;
(b) a lift turbine having a second set of blades, the second set of blades generating lift force, the second set of blades rotating into the counter rotation flow of the gas; and
the axial flow turbine assembly including:
(a) an axial flow input stator having a third set of blades;
(b) an axial flow turbine having a fourth set of blades, the fourth set of blades rotating into the counter rotation flow; wherein the container is sealed from an outside atmosphere.

2. The apparatus of claim 1 wherein rotation of the lift turbine operates a pump.

3. The apparatus of claim 2 wherein the pump drives hydraulic fluid, the hydraulic fluid operating a machine.

4. The apparatus of claim 3 wherein the machine is a heat exchanger.

5. The apparatus of claim 3 wherein the machine is an electric generator.

6. The apparatus of claim 3 wherein the machine is a needle valve.

7. The apparatus of claim 6 wherein the needle valve is configured to control and regulate a speed of the lift turbine relative to a speed of the gas flow.

8. The apparatus of claim 3 wherein the machine is a pressurized accumulator.

9. The apparatus of claim 1 wherein the gas is compressed above one atmosphere.

10. The apparatus of claim 1 wherein the gas remains at a substantially steady pressure in the container.

11. The apparatus of claim 1 wherein the container is substantially toroidal in shape.

12. The apparatus of claim 1 wherein the gas is helium.

13. The apparatus of claim 1 wherein the gas is carbon dioxide ($CO_2$).

14. The apparatus of claim 1 wherein no gas is vented from the container.

15. The apparatus of claim 1 wherein the gas remains at a substantially steady temperature.

16. The apparatus of claim 1 wherein the lift turbine and the axial flow turbine rotate as a single unit.

17. The apparatus of claim 1 wherein the fourth set of blades are adjustable.

18. The apparatus of claim 1 wherein a normal component of the generated lift force is used to generate thrust.

19. The apparatus of claim 17 wherein the generated thrust is independent of a velocity associated with the apparatus.

20. The apparatus of claim 18 further comprising a needle valve operatively interconnected with the lift turbine assembly, wherein opening of the needle valve causes the lift turbine to speed up and a amount of generated thrust to decrease.

21. The apparatus of claim 20 wherein closing the needle valve causes the amount of generated thrust to increase.

22. The apparatus of claim 1 wherein a lift to drag ratio (L/D) of the lift turbine is greater than 1:1.

23. The apparatus of claim 22 wherein the L/D is approximately 150:1.

* * * * *